United States Patent
Shimizu et al.

(10) Patent No.: US 6,864,605 B2
(45) Date of Patent: Mar. 8, 2005

(54) BRUSHLESS MOTOR AND ELECTRIC POWER STEERING APPARATUS EQUIPPED WITH THE BRUSHLESS MOTOR

(75) Inventors: Yasuo Shimizu, Wako (JP); Atsuhiko Yoneda, Wako (JP); Hitoshi Shiobara, Wako (JP); Takashi Kuribayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/420,586

(22) Filed: Apr. 21, 2003

(65) Prior Publication Data
US 2003/0201681 A1 Oct. 30, 2003

(30) Foreign Application Priority Data
Apr. 30, 2002 (JP) ........................................ 2002-128411

(51) Int. Cl.[7] ................................................. H20K 7/00
(52) U.S. Cl. ...................... 310/68; 310/156.12; 310/89; 310/254; 310/258; 310/259
(58) Field of Search .............................. 310/68, 156.12, 310/89, 254, 258, 259

(56) References Cited

U.S. PATENT DOCUMENTS

| | | | | |
|---|---|---|---|---|
| 3,505,547 A | * | 4/1970 | Kansaku | 310/67 |
| 5,982,067 A | * | 11/1999 | Sebastian | 310/184 |
| 6,093,984 A | * | 7/2000 | Shiga | 310/26 |
| 6,617,746 B1 | * | 9/2003 | Moslov | 310/254 |
| 6,727,629 B1 | * | 4/2004 | Soghomonian | 310/254 |

FOREIGN PATENT DOCUMENTS

| JP | 59044957 A | 3/1984 |
|---|---|---|
| JP | 2001275325 A | 10/2001 |

* cited by examiner

Primary Examiner—Darren Schuberg
Assistant Examiner—Iraj Mohandesi
(74) Attorney, Agent, or Firm—Merchant & Gould P.C.

(57) ABSTRACT

Brushless motor is provided which includes an outer stator and an inner rotor having a plurality of permanent magnets. One or inner surface of the outer stator, opposed to the inner rotor, is covered with a cover formed of a magnetic material and in the shape of a cylinder of a small wall thickness. The magnetic cover has a plurality of slits inclined with respect to the rotational axis of the inner rotor. Magnetic portions formed or left between the slits of the cover are also inclined with respect to the rotational axis of the inner rotor. With such magnetic portions, boundaries between magnetic poles are virtually inclined with respect to the rotational axis of the inner rotor, so that undesired cogging torque of the motor can be minimized.

6 Claims, 17 Drawing Sheets

BRUSHLESS MOTOR AND ELECTRIC POWER STEERING APPARATUS EQUIPPED WITH THE BRUSHLESS MOTOR

FIELD OF THE INVENTION

The present invention relates to an improved brushless motor and an electric power steering apparatus equipped with such an improved brushless motor.

BACKGROUND OF THE INVENTION

Brushless motors, which are also called commutator less motors, have electric contacts in place of mechanical contacts such as a commutator and brushes. One example of such brushless motors is disclosed in Japanese Patent Laid-open Publication No. 2001-275325 for "Electric Power Steering Apparatus". The brushless motor disclosed in the No. 2001-275325 publication is an inner-rotor type brushless D.C. motor, which includes a cylindrical outer stator having a plurality of armature windings provided thereon and an inner rotor rotatably disposed in the outer stator and having a plurality of permanent magnets secured to the circumference thereof.

The electric power steering apparatus for a motor vehicle, which is equipped with the brushless motor, is constructed to not only transmit steering torque, applied manually by a human vehicle operator or driver to the steering wheel (hereinafter also referred to as "drive-applied steering torque"), to a pinion shaft of a rack-and-pinion mechanism but also transmit steering assist torque, generated by the brushless motor in response to the driver-applied steering torque, so that steerable road wheels of the vehicle are steered via the rack-and-pinion mechanism. When the steering torque applied to the steering wheel (i.e., driver-applied steering torque) is relatively small, the steerable road wheels are steered in accordance with the driver-applied steering torque with no steering assist torque given from the brushless motor. When, on the other hand, the steering torque applied to the steering wheel is greater than a predetermined value, the steerable road wheels are steered by a combination of the driver-applied steering torque and steering assist torque.

Because the brushless motors generally present a smaller moment of inertia than the brushed motors and no brush-caused loss, they give rise to much less electrical losses. Electric power steering apparatus equipped with such a brushless motor can afford a good steering feel as the driver quickly turns the steering wheel in the opposite direction. Further, the brushless motors, which cause smaller friction torque, achieve advantageous benefits, such as better returning of the steering wheel.

However, the brushless motors have the following problems. Normally, when the armature windings are not being energized, cogging torque (magnetic attractive/repulsive force) acts between the magnetic poles of the outer stator and inner rotor. In the brushless motors having salient-pole windings, there would arise relatively great cogging torque due to a smaller number of magnetic poles, and thus torque variations due to the relatively great cogging torque could become a significant problem. Therefore, it is preferable to minimize the cogging torque. For example, when a motor vehicle provided with an electric power steering apparatus is traveling straight forward, the steering angle of the steering wheel is relatively small. During that time, the steerable road wheels are steered at relatively small angles, in which case only the tire treads of the steerable road wheels deform slightly. Consequently, a road surface reaction force (i.e., frictional resistance between the road surface and the tires) is relatively small, so that only relatively small steering torque has to be applied by the driver to the steering wheel and thus no steering assist torque is necessary.

Namely, where steering wheel may be maneuvered by the driver through small angles around its neutral position and thus the steerable road wheels may be steered with the driver-applied steering torque alone, the steering feel can be effectively enhanced by allowing the driver to constantly maneuver the steering wheel with substantially the same steering torque.

However, when the brushless motor is not being driven because only small steering torque is necessary, not only the steerable road wheels are steered in accordance with the driver-applied steering torque but also the inner rotor of the brushless motor is rotated in accordance with the driver-applied steering torque. Therefore, if undesired cogging torque of the brushless motor is great, torque fluctuations may be produced on the steering wheel, which may undesirably impair the steering feel during high-speed straight forward travel of the vehicle. For this reason, reducing the cogging of the brushless motor can be an important condition or factor for an enhanced steering feel.

To reduce the undesired cogging torque of the brushless motor, it may be effective to slant teeth-shaped magnetic paths where the armature windings of the outer stator are provided, or slant the magnetic poles of the permanent magnets provided on the inner rotor. However, slanting the teeth of the outer stator would complicate the structure of the motor and also require the windings to be slanted with respect to the rotational axis of the rotor. Thus, the conventional winding machine can not be used, and various other manufacturing difficulties would be encountered.

The brushless motor having slanted magnetic paths of the permanent magnets is known, for example, from Japanese Patent Laid-open Publication No. SHO-59-44957 for "Electric Machine Having Energization Control Means". In the electric machine disclosed in the No. SHO-59-44957 publication, a plurality of permanent magnets are provided on the rotor in such a manner that boundaries between the magnetic poles of the circumferentially-adjoining permanent magnets are slanted with respect to the rotational axis of the rotor. As mentioned in the publication, in the case where a plurality of permanent magnets are positioned on the rotor in a circular arrangement or configuration, the radius of curvature of the inner peripheral surface (i.e., surface adhered to the rotor) of each of the permanent magnets must satisfy a very severe tolerance, e.g. for preventing an undesired runout of the rotor. Further, it is very difficult to uniformly magnetize the slanted magnetic poles from end to end, so that slanting the magnetic pole boundaries with respect to the rotational axis of the rotor is not necessarily an easy task.

For the aforementioned reasons, there are increasing demands for a technique capable of readily minimizing the cogging torque of the brushless motor, as well as an electric power steering apparatus capable of achieving a highly improved steering feel.

SUMMARY OF THE INVENTION

In order to accomplish the above-mentioned object, there is provided a brushless motor which comprises: a stator including a plurality of armatures; a rotor provided in operative combination with the stator and including a plurality of permanent magnets provided on and along the circumference thereof; and a cover formed of a magnetic material into a cylindrical shape having a relatively small wall thickness, the cover covering a surface of the stator opposed to the rotor, the cover having a plurality of slits formed therein to incline with respect to a rotational axis of the rotor.

With the inventive arrangement that the rotor-side surface of the stator is covered with the cylindrical magnetic cover of a small wall thickness and the cylindrical magnetic cover have a plurality of slits formed therein and inclined with respect to the rotational axis of the rotor, the magnetic material can be left on the cover between the slits, to thereby provide closed magnetic portions that are also inclined with respect to the rotational axis of the rotor. These magnetic portions function to restrict magnetic attraction and repulsion between the magnetic poles of the stator and rotor. Further, with the provision of such magnetic portions inclined with respect to the rotor's rotational axis, the boundaries between the magnetic poles are virtually inclined with respect to the rotor's rotational axis. As a consequence, it is possible to reduce the undesired cogging torque of the brushless motor. Further, with only such simple arrangement that the plurality of slits inclined with respect to the rotator's rotational axis are formed in the cylindrical magnetic cover and the rotor-side surface of the stator is covered with the magnetic cover, the magnetic poles of the stator can be inclined with ease. Therefore, the undesired cogging torque of the brushless motor can be reduced with the simple arrangement of the present invention.

The present invention also provides a brushless motor which comprises: a stator including a plurality of armatures; and a rotor provided in operative combination with the stator and including a plurality of permanent magnets positioned on and along the outer circumference thereof, each of the permanent magnets having a sectional shape asymmetrical, as viewed along the circumference of the rotor, with respect to a predetermined imaginary reference line extending in a radial direction of the rotor, each of the permanent magnets being divided in the axial direction of the rotor into a plurality of divided magnet members, axially adjacent ones of the divided magnet members in each of the permanent magnets being positioned on the rotor in such a manner that the asymmetrical sectional shapes of the axially adjacent divided magnet members present opposite orientations.

Because each of the permanent magnets is formed into an asymmetrical sectional shape with respect to an imaginary straight line extending from the center of the rotor at right angles to the surface of the magnet secured to the rotor, the air gap between the surface of the magnet secured to the rotor and the rotor-side surface of the stator is not uniform. Specifically, the air gap is smaller at the position of a surface portion of the magnet closet to the stator, i.e. at a most-projecting distal end of the magnet. The smaller air gap can increase the intensity of the magnetic force acting on the stator member.

Further, with the permanent magnets each having an asymmetrical sectional shape and divided in the axial direction of the rotor into a plurality of divided magnet members, axially adjacent ones of the divided magnet members in each of the permanent magnets being positioned on the rotor in such a manner that the asymmetrical sectional shapes of the axially adjacent divided magnet members present opposite orientations, the most-projecting distal ends of the divided magnet members differ in phase. If the most-projecting distal ends of the different phases in the individual permanent magnets are connected by imaginary straight lines, the imaginary straight lines slant with respect to the rotational axis of the rotor. Regions overlapping the imaginary straight lines and regions in the neighborhood of the imaginary straight lines may be considered to be regions where the magnetic force acting on the stator is greatest, i.e. virtual strong magnetism regions.

A specific number of the virtual strong magnetism regions, corresponding to the number of the permanent magnets or magnetic poles, are produced along the circumferential direction of the rotor. Also, between the virtual strong magnetism regions, there are produced regions where the magnetic force acting on the stator is smallest, i.e. virtual weak magnetism regions. These virtual weak magnetism regions function as virtual magnetic pole boundaries, so that the magnet pole boundaries are virtually inclined with respect to the rotational axis of the rotor. Thus, it is possible to reduce the cogging torque of the brushless motor with a simple construction.

With such simple arrangements, the magnetic poles on the rotor can be inclined with ease. Further, because it is only necessary that the permanent magnets, each having the asymmetrical sectional shape, be divided in the axial direction of the rotor into a plurality of divided magnet members and the thus-divided magnet members be placed in horizontally opposite orientations along the longitudinal or axial direction of the rotor, the permanent magnets can be secured to the rotor with ease, without involving the manufacturing difficulties as encountered by the prior art employing permanent magnets placed in a circular configuration, such as severe tolerance management and uniform magnetization from end to end of inclined magnetic poles. Thus, it is possible to reduce the cogging torque of the brushless motor.

The present invention also provides a brushless motor which comprises: a stator including a plurality of armatures; and a rotor provided in operative combination with the stator and including a plurality of permanent magnets positioned on and along the circumference thereof, each of the permanent magnets being magnetized in a direction inclined, in the circumferential direction of the rotor, with respect to the surface thereof secured to the rotor, each of the permanent magnets being divided in the axial direction of the rotor into a plurality of divided magnet members, adjacent ones of the divided magnet members in each of the permanent magnets being positioned on the rotor in opposite orientations. With each of the permanent magnets magnetized in a direction inclined, in the circumferential direction of the rotor, with respect to the surface thereof secured to the rotor, the magnetism position can be slanted in the circumferential direction of the rotor.

Because each of the permanent magnets having the slanted magnetism position is divided in the axial direction of the rotor into divided magnet members and the divided magnet members of each of the permanent magnets are positioned on the rotor in such a manner that the axially adjoining divided magnet members are magnetized in opposite directions, the magnetic forces of the divided magnet members differ in phase. If the magnetic poles of different phases in each of the permanent magnets are connected by an imaginary straight line M2, the line M2 is inclined with respect to the rotational axis of the rotor. Regions overlapping the imaginary straight line and regions in the neighborhood of the imaginary straight line may be considered to be regions where the magnetic force acting on the stator is greatest, i.e. virtual strong magnetism regions.

A specific number of the virtual strong magnetism regions, corresponding to the number of the permanent magnets or magnetic poles, are produced along the circumferential direction of the rotor. Also, between the virtual strong magnetism regions, there are produced regions where the magnetic force acting on the stator is smallest, i.e. virtual weak magnetism regions. These virtual weak magnetism regions function as virtual magnetic pole boundaries, so that the weak magnetism regions are virtually inclined with respect to the centerline. Thus, it is possible to reduce the cogging torque of the brushless motor.

With such simple arrangements having been described above, the magnetic poles on the rotor can be inclined with ease. Further, because it is only necessary that the permanent magnets, each having the magnetic force position slanted, be divided into a plurality of divided magnet members and the thus-divided axially adjoining magnet members be placed so that their magnetizing directions are opposite to each other, the permanent magnets can be secured to the rotor with ease, without involving the manufacturing difficulties as encountered by the prior art employing permanent magnets positioned in a circular configuration, such as severe tolerance management and uniform magnetization from end to end of the inclined magnetic poles. Thus, it is possible to minimize the cogging torque of the brushless motor, According to another aspect of the present invention, there is provided an electric power steering apparatus for use in a motor vehicle, which comprises: a steering system extending from a steering wheel to steerable road wheels; a steering torque sensor for detecting steering torque produced on the steering wheel, to thereby generate a steering torque detection signal; a brushless motor for generating steering assist torque under control of a control unit on the basis of the steering torque detection signal generated by the steering torque sensor; and a torque transmission mechanism for transmitting the steering assist torque, generated by the brushless motor, to the steering system. In this electric power steering apparatus, the brushless motor comprises: a stator including a plurality of armatures; a rotor provided in operative combination with the stator and including a plurality of permanent magnets positioned on and along the circumference thereof; and a cover formed of a magnetic material into a cylindrical shape having a relatively small wall thickness, the cover covering a surface of the stator opposed to the rotor, the cover having a plurality of slits formed therein to incline with respect to a rotational axis of the rotor.

The present invention also provides an electric power steering apparatus for use in a motor vehicle, which comprises: a steering system extending from a steering wheel to steerable road wheels; a steering torque sensor for detecting steering torque produced on the steering wheel, to thereby generate a steering torque detection signal; a brushless motor for generating steering assist torque under control of a control unit on the basis of the steering torque detection signal generated by the steering torque sensor; and a torque transmission mechanism for transmitting the steering assist torque, generated by the brushless motor, to the steering system, the brushless motor comprising: a stator including a plurality of armatures; and a rotor provided, in operative combination with the stator and including a plurality of permanent magnets positioned on and along the circumference thereof, each of the permanent magnets having an asymmetrical sectional shape, along the circumference of the rotor, with respect to a predetermined imaginary reference line extending in a radial direction of the rotor, each of the permanent magnets being divided in an axial direction of the rotor into a plurality of divided magnet members, axially adjacent ones of the divided magnet members in each of the permanent magnets being positioned on the rotor in such a manner that the asymmetrical sectional shapes of the axially adjacent divided magnet members present opposite orientations.

The present invention also provides an electric power steering apparatus for use in a motor vehicle, which comprises: a steering system extending from a steering wheel to steerable road wheels; a steering torque sensor for detecting steering torque produced on the steering wheel, to thereby generate a steering torque detection signal; a brushless motor for generating steering assist torque under control of a control unit on the basis of the steering torque detection signal generated by the steering torque sensor; and a torque transmission mechanism for transmitting the steering assist torque, generated by the brushless motor, to the steering system, the brushless motor comprising: a stator including a plurality of armatures; and a rotor provided in operative combination with the stator and including a plurality of permanent magnets positioned on and along the circumference thereof, each of the permanent magnets being magnetized in a direction inclined, in a circumferential direction of the rotor, with respect to a surface thereof secured to the rotor, each of the permanent magnets being divided in the axial direction of the rotor into a plurality of divided magnet members, adjacent ones of the divided magnet members in each of the permanent magnets being positioned on the rotor so that magnetizing directions of the divided magnet members are opposite to each other.

In the electric power steering apparatus employing any one of the improved or inventive brushless motors capable of minimized cogging torque, it is possible to minimize influences, on the steerable road wheels, of the cogging torque of the motor, for example, in a case where the steering wheel is maneuvered through very small angles around its neutral position, such as during high-speed straight travel of the vehicle. Thus, the present invention can afford a smooth and hence enhanced steering feel of the steering wheel. As a result, the present invention can provide an improved electric power steering apparatus capable of a highly enhanced steering feel.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
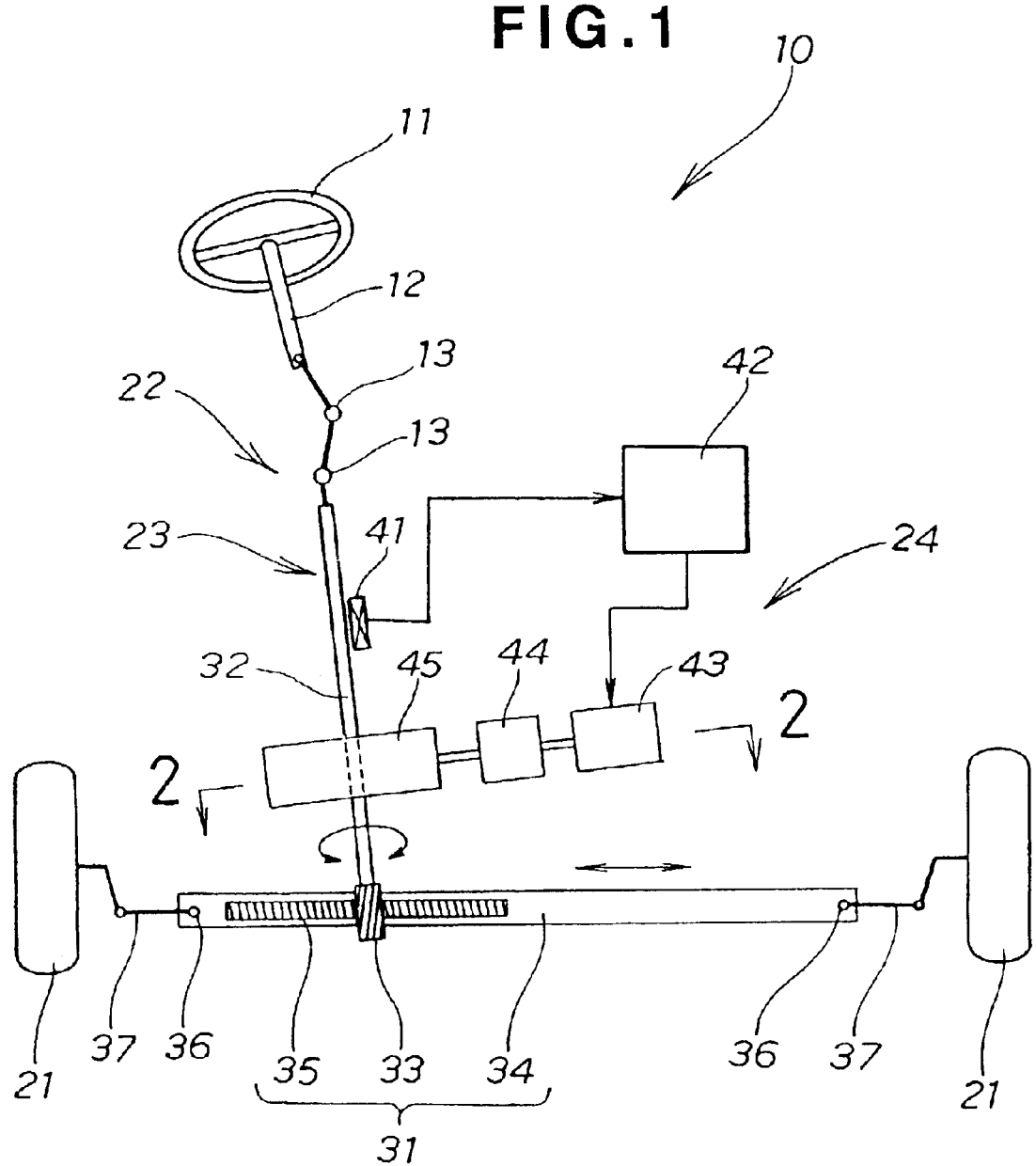
FIG. 1 shows an electric power steering apparatus employing a brushless motor of the present invention.

FIG. 1 shows an electric power steering apparatus 10 for a motor vehicle in accordance with an embodiment the present invention, which comprises a steering system 22 extending from a steering wheel 11 to left and right steerable road wheels 21. The steering system 22 includes a steering mechanism 23 and a steering torque assisting mechanism 24 for supplying a steering torque assist to the steering mechanism 23.

The steering mechanism 23 includes a rack-and-pinion mechanism 31 having a pinion shaft 32 connected to the steering wheel 11 via a steering shaft 12 and universal joints 13 and a rack shaft 34 connected to the left and right steerable road wheels 21 via left and right ball joints 36 and left and right tie rods 37. The rack-and-pinion mechanism 31 also includes a pinion 33 formed on the pinion shaft 32, and a rack 35 formed on the rack shaft 34.

As a vehicle driver maneuvers the steering wheel 11, the left and right steerable road wheels 21 are steered, in accordance with steering torque manually applied by the vehicle driver (driver-applied steering torque), via the rack-and-pinion mechanism 31 and left and right tie rods 37.

The steering torque assisting mechanism 24 includes a steering torque sensor 41 for detecting the steering torque applied to the steering system 22 through the driver's maneuver of the steering wheel 11, and a control unit 42 for generating a control signal on the basis of a steering torque detection signal output from the steering torque sensor 41. The steering torque assisting mechanism 24 also includes a brushless electric motor 43 for generating steering assist torque corresponding to the steering torque on the basis of the control signal, and the motor 43 transmits the thus-generated steering assist torque to the pinion shaft 32 via a torque limiter 44 and reduction mechanism 45.

Namely, the electric power steering apparatus 10 not only transmits the steering torque, applied to the steering wheel 11, to the pinion shaft 32 of the rack-and-pinion mechanism 31 but also transmits the steering assist torque, generated by the motor 43 in accordance with the driver-applied steering torque, to the pinion shaft 32 via the reduction mechanism 45, so that the steerable road wheels 21 are steered via the rack-and-pinion mechanism 31 in accordance with composite torque, i.e. a combination of the driver-applied steering torque and steering assist torque generated by the motor 43.

Figure 2:
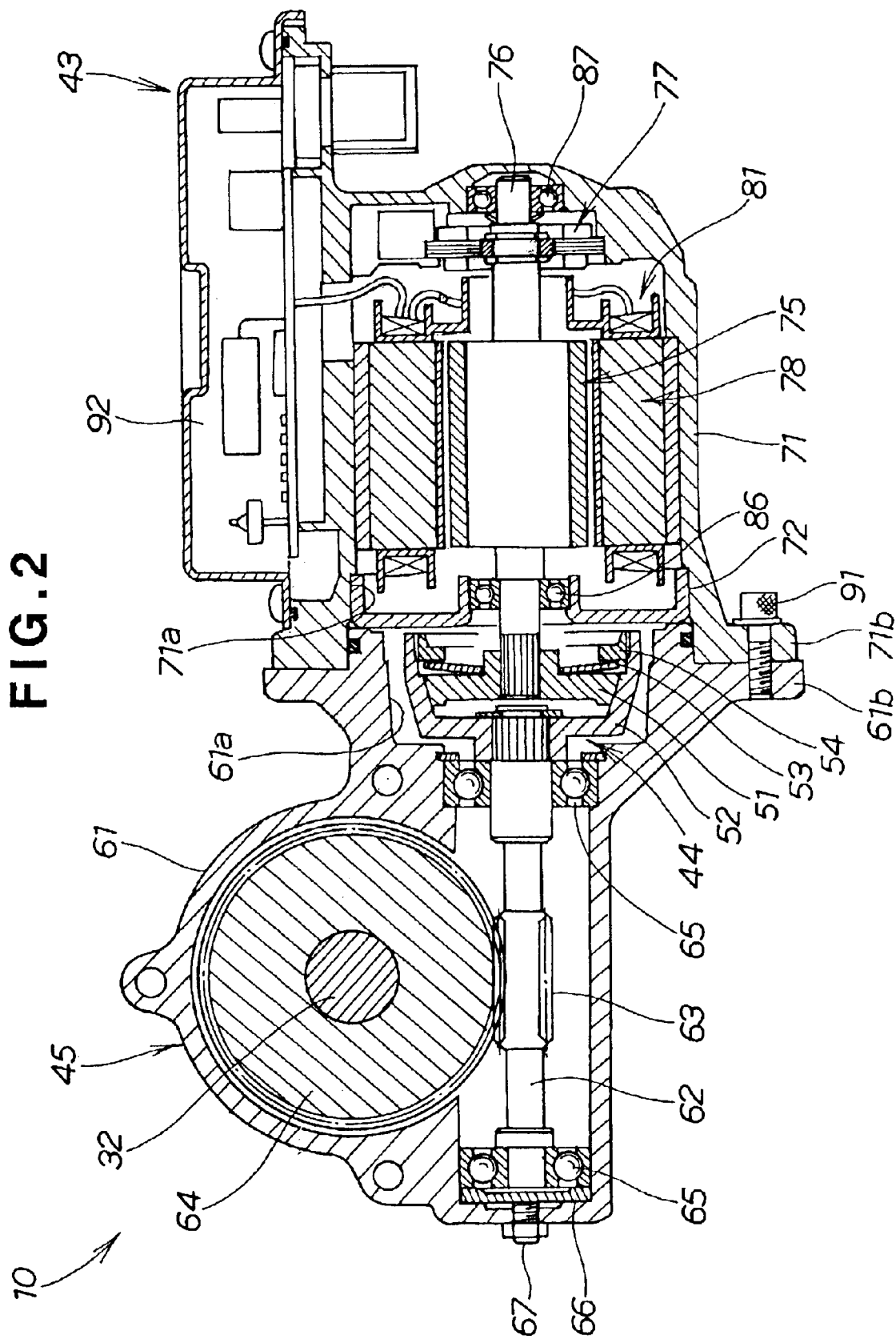
FIG. 2 is a sectional view taken along the 2—2 line of FIG. 1, which shows the brushless motor, torque limiter and reduction mechanism.

FIG. 2 is a sectional view showing how the motor 43, torque limiter 44 and reduction mechanism 45 are constructed and operatively combined.

The torque limiter 44 is a torque limiting mechanism including an inner member 51 in the form of a male taper having an inner periphery serration-coupled to a motor shaft 76 of the motor 43, and the inner member 51 is fitted in an outer member 52 in the form of a cup-like female taper. The outer peripheral surface of the inner member 51 and the inner peripheral surface of the outer member 52 are kept in contact with each other with a predetermined frictional force; namely, the outer peripheral surface of the inner member 51 and the inner peripheral surface of the outer member 52 are frictionally coupled with each other. Reference numeral 53 represents a disk-shaped spring, and 54 represents a nut.

The reduction mechanism 45, which is a torque transmission means for transmitting, to the pinion shaft 32 of the steering system 22 of FIG. 1, the steering assist torque generated by the motor 43, includes a worm gear mechanism accommodated in a reduction mechanism case 61. More specifically, the reduction mechanism 45 includes a worm shaft (input shaft) 62 coupled via the torque limiter 44 to the motor shaft 76, a worm gear 63 formed on the worm shaft 62, and a worm wheel 64 coupled to the pinion shaft (output shaft) 32 extending perpendicularly to the sheet of the drawing.

The worm shaft 62 is disposed concentrically with the motor shaft 76, and the worm shaft 62 is supported via two bearings 65 on the reduction mechanism case 61 in such a manner that it is rotatable but prevented from axial displacement. Reference numeral 66 represents a leaf spring, and 67 represents an adjusting bolt.

The reduction mechanism case 61 has an aperture 61a opening toward the inner rotor 75, and an outer flange 61b integrally formed around the aperture 61a. Motor case 71 is in the form of a bottomed cylindrical case, which has an aperture 71a opening toward the outer flange 61b of the reduction mechanism case 61 and an outer flange 71b integrally formed around the aperture 71a. The motor case 71 is removably attached to the reduction mechanism case 61 by fastening together the irrespective outer flanges 71b and 61b via a bolt 91. Reference numeral 92 represents a motor drive control section.

Now, a description will be given about the electric motor (brushless motor) 43 employed in the electric power steering apparatus 10, with reference to FIGS. 3 to 7.

Figure 3:
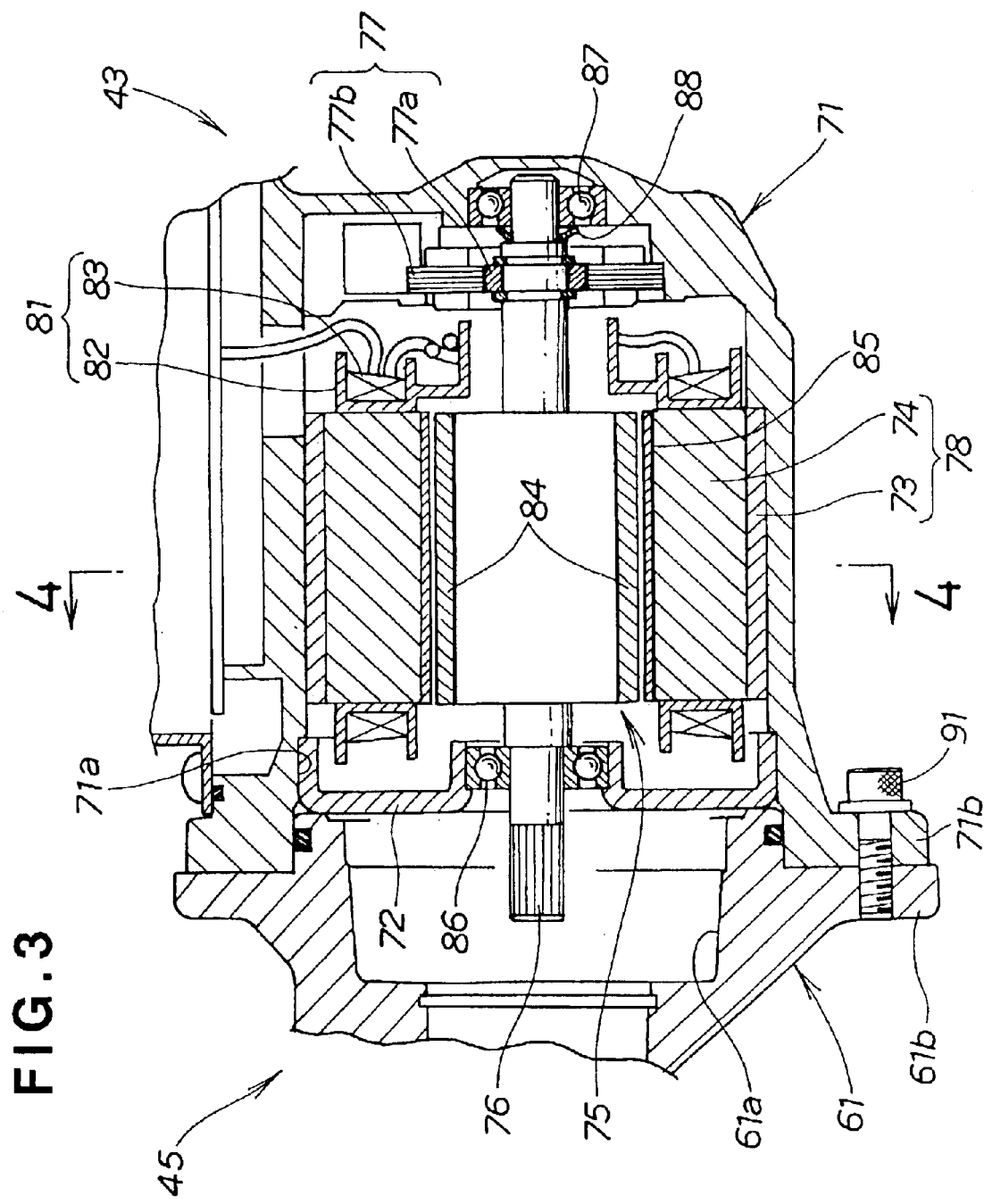
FIG. 3 is a sectional view of a first embodiment of the brushless motor shown in FIG. 2.

As illustrated in FIG. 3, the electric motor 43 is an inner-rotor type brushless D.C. motor, which includes the motor case 71, a lid 72 closing the aperture 71a of the motor case 71, a first outer stator member 73 of a cylindrical shape fitted in the motor case 71, a second outer stator member 74 of a cylindrical shape fitted in the first outer stator member 73, the inner rotor 75 of a cylindrical shape disposed in the second outer stator member 74, the motor shaft (output shaft) 76 integrally formed with the inner rotor 75 and a phase detection sensor 77 for detecting a current phase of the inner rotor 75.

The first outer stator member 73 and second outer stator member 74, each made of a magnetic substance, together constitute an outer stator 78 secured to the motor case 71. The outer stator 78 includes a plurality of armatures 81 placed along the circumference thereof. Each of the armatures 81 includes a bobbin 82 and windings 83 mounted on the bobbin 82.

Figure 4:
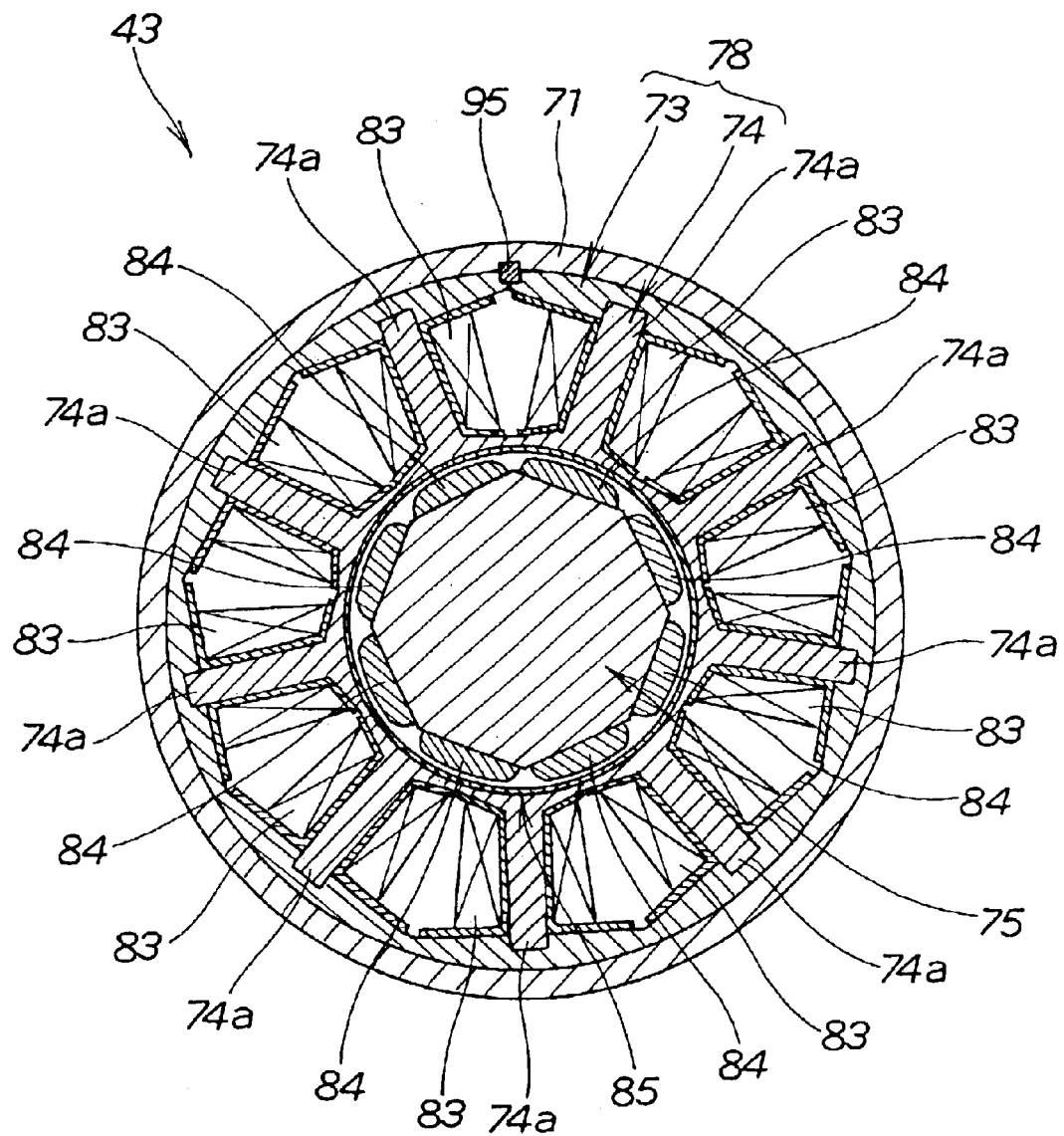
FIG. 4 is a sectional view of the brushless motor taken along the 4—4 line of FIG. 3.

The inner rotor 75 includes a plurality of axial permanent magnets 84 placed along the circumference thereof (see FIG. 4). The motor shaft 76, extending horizontally with its one end (output end) projecting into the reduction mechanism case 61, is rotatably supported by the motor case 71 and lid 72 via two bearings 86 and 87 in such a manner that its axial displacement is duly prevented. The phase detection sensor 77 includes a layered core rotor 77a mounted on the motor shaft 76, and a detection element 77b for magnetically detecting a current phase of the core rotor 77a. Reference numeral 88 represents a disk-shaped spring.

As illustrated in FIG. 4, the second outer stator 74 has nine salient poles 74a formed on the outer peripheral surface of its cylindrical portion at uniform intervals and extending radially outwardly from the outer peripheral surface, and each of the nine salient poles 74a has the windings 81 mounted thereon and is in the form of a fin having a predetermined thickness.

Figure 5:
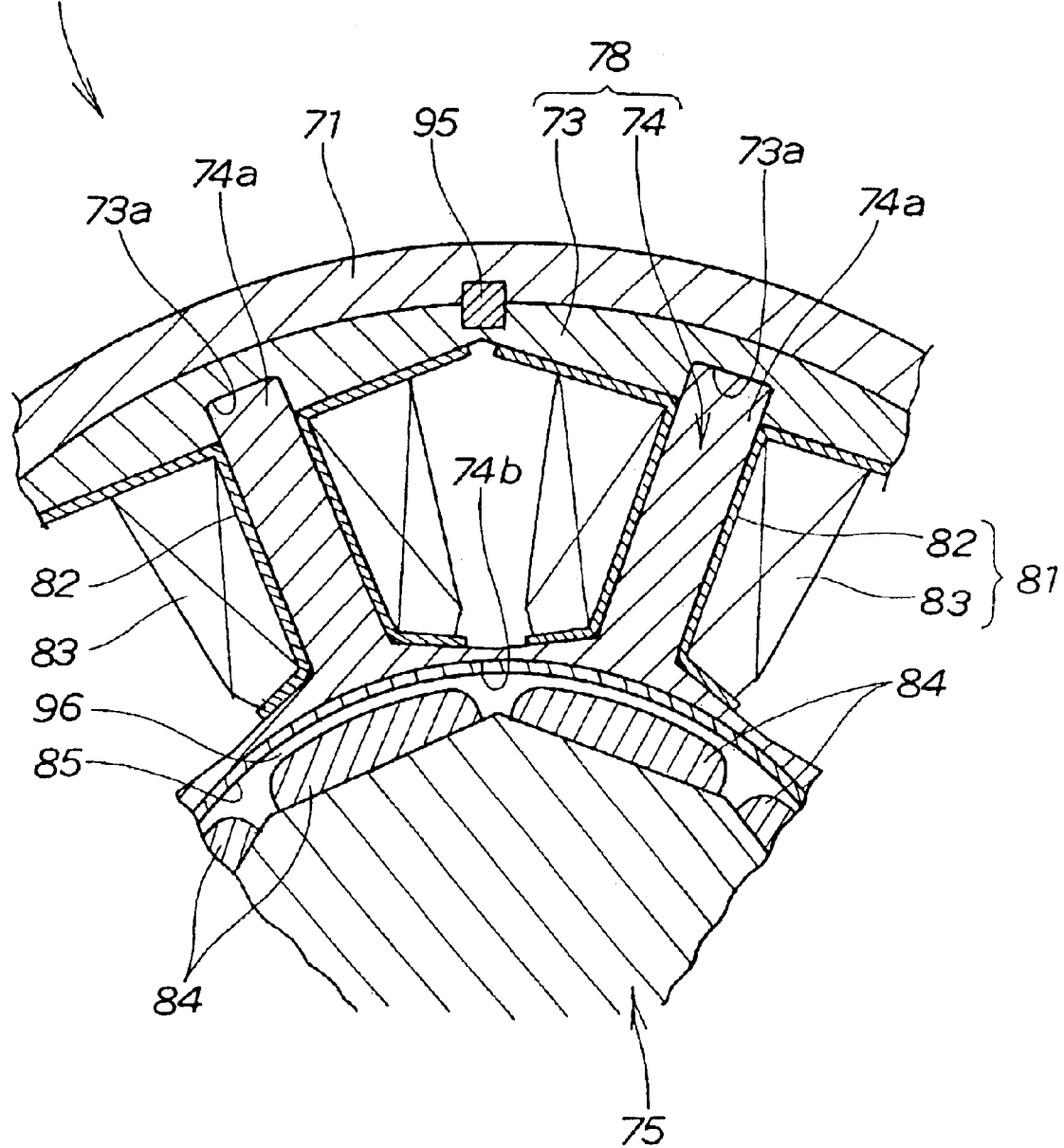
FIG. 5 is an enlarged fragmentary view of the brushless motor shown in FIG. 4.

The plurality of, e.g. eight, permanent magnets 84 are each an axial magnet having an arcuate outer surface and magnetized in the radial direction of the inner rotor 75 (in the inner-and-outer direction or across the thickness of the magnet). As seen in FIG. 5, the permanent magnets 84 are placed such that their N and S magnetic poles alternate along the outer peripheral surface of the inner rotor 75.

FIG. 5 shows portions of the outer stator 78 and inner rotor 75 of FIG. 4 on a magnified scale.

The first outer stator member 73 is positioned circumferentially relative to the motor case 71 via a positioning pin 95. The first outer stator member 73 has a plurality of grooves 73a formed in its inner peripheral surface and extending in the axial direction, i.e. in the direction perpendicular to the sheet of the drawing. The second outer stator member 74 is positioned circumferentially relative to the first outer stator member 73, by fitting tip end portions of the individual salient poles 74a in the grooves 73a.

The armatures 81, each having the windings 83 mounted on the cylindrical bobbin 82, are fittedly engaged with the salient poles 74a. In this way, the windings 83 are mounted on each of the salient poles 74a.

Inner surface (rotor-side surface) 74b of the second outer stator member 74, opposed to the inner rotor 75, is covered with a magnetic cover 85 of a cylindrical shape having a small wall thickness. The covering of the inner surface 74b is performed by pressing the outer peripheral surface of the magnetic cover 85 against the inner surface 74b. Small air gap 96 is left between the outer surfaces of the permanent magnets 84 and the inner surface of the magnetic cover 85.

Figure 6:
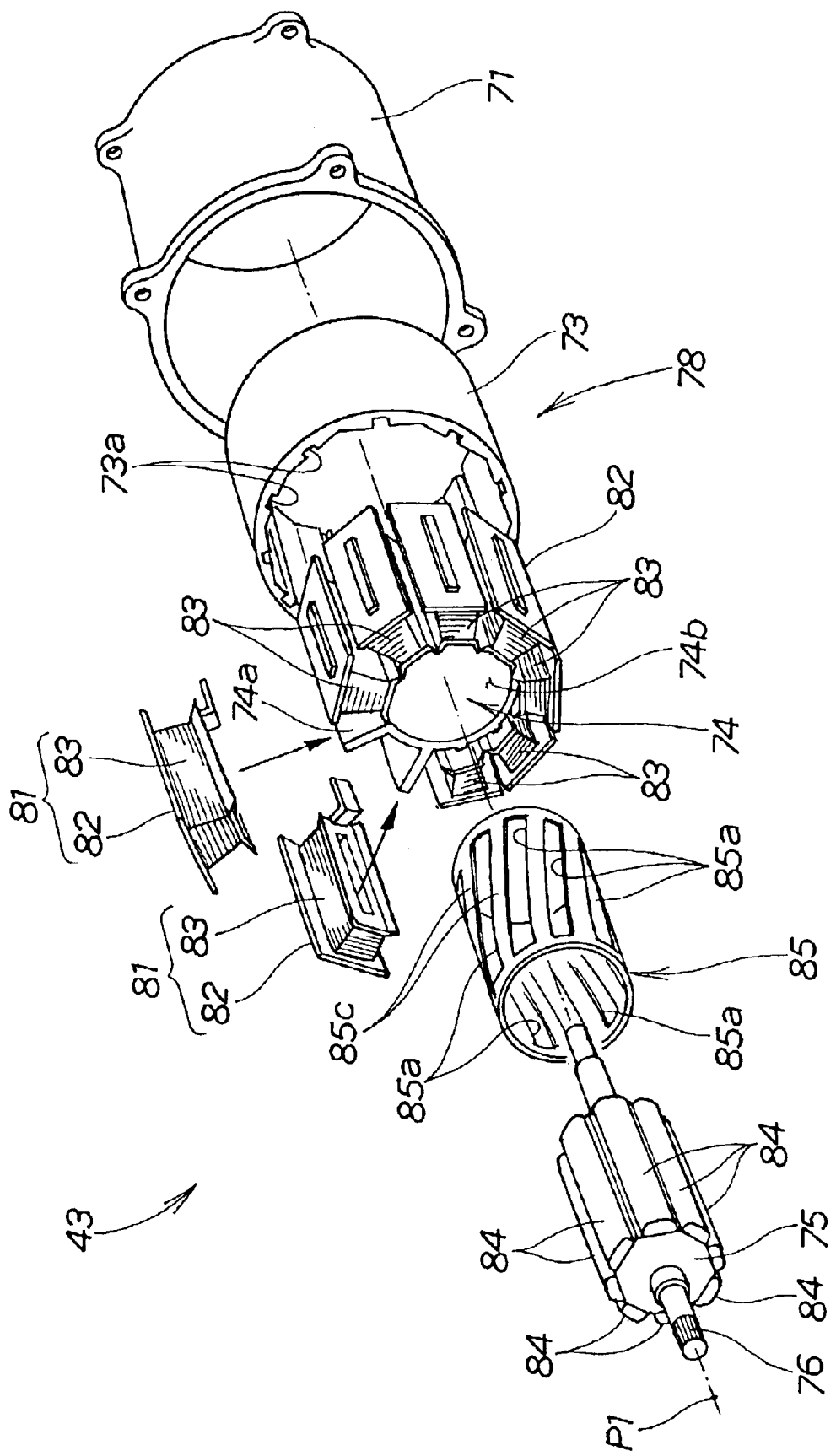
FIG. 6 is an exploded view of the first embodiment of the brushless motor.

As illustrated in FIG. 6, the cylindrical outer stator 78 having the windings 83 of the nine salient magnetic poles in the circumferential direction can be assembled together, by inserting the second outer stator member 74 in the first outer stator member 73 after fitting, with the respective salient poles 74a, the cylindrical bobbins 82 having the windings 83 mounted thereon. Also, the outer stator 78 can be attached to the motor case 71, by inserting the former in the latter.

The magnetic cover 85 has a plurality of slits 85a inclined with respect to the motor shaft 76 functioning as the rotation shaft of the inner rotor 75, i.e. the rotational axis or axial centerline P1 of the rotor 75 and motor shaft 76.

FIGS. 7(a) to (e) are views showing more structural details of the second outer stator member 74 and magnetic cover 85. FIG. 7(a) shows in section how the magnetic cover 85 is combined with the second outer stator member 74 formed of a magnetic substance, FIG. 7(b) shows the entire structure of the magnetic cover 85 in a perspective view, and FIG. 7(c) shows the outer surface of the magnetic cover 85 in a developed state. Further, FIG. 7(d) shows the outer surface of the second outer stator member 74 in a developed state, and FIG. 7(e) shows the magnetic cover 85 and second outer stator member 74 in a combined state. The illustrated example of FIG. 7(a) assumes that the uppermost position is a 0° angular position which is followed by 90°, 180° and 270° angular positions in the clockwise direction of the figure.

As noted earlier, the second outer stator member 74 has the nine salient poles 74a extending radially at uniform intervals. The slits 85a, each in the form of an elongated hole formed through the wall thickness of the magnetic cover 85, are located at predetermined uniform intervals along the circumferential direction of the cover 85. As seen in FIG. 7(c), in the developed view of the magnetic cover 85, each of the slits 85a presents the shape of a parallelogram.

The total number of the slits 85a is equal to the total number of the salient poles 74a. More specifically, the magnetic cover 85 has the plurality of slits 85a with narrow connecting portions 85b left on axially opposite ends of the cylinder of the magnetic cover 85; the slits 85a are formed at the uniform intervals between the narrow connecting portions 85b, with land or closed portions 85c being left between the slits 85a. The slits 85a and land or closed portions 85c are placed in parallel to each other alternately along the circumferential direction of the magnetic cover 85.

The slits 85a, each of which is a nonmagnetic portion devoid of the magnetic substance, function as magnetism passage permitting portions which permit passage of magnetism in the radial direction of the magnetic cover 85. On the other hand, the closed portions 85c, each of which is a magnetic portion having the magnetic substance, function as magnetism passage restricting portions which restrict passage of magnetism in the radial direction of the magnetic cover 85.

As seen in FIG. 7(e), the slits 85a of the magnetic cover 85 are placed in such a manner that the center of each of the slits 85a overlaps a substantial center position of a corresponding one of the salient poles 74a. Specifically, each of the land or closed portions 85c of the magnetic cover 85 spans obliquely between a pair of adjacent salient poles 74a. For example, as illustrated in FIG. 7(e), if a particular one of the salient poles 74a is placed at the 0° position, one end of one of the closed portions 85c substantially overlaps one end (left end in FIG. 7(e)) of the particular salient pole 74a, and the end of one of the closed portions 85c substantially overlaps one end (right end in FIG. 7(e)) of the salient pole 74a adjoining the particular salient pole 74a.

Therefore, the slits 85a and closed portions 85c are all inclined at the same angle. Because the ends of the closed portions 85c substantially overlap the ends of the salient poles 74a, the width W2 of each of the closed portions 85c is substantially equal to the width W1 of each of the salient poles 74a.

As a consequence, the elongated slits 85a of the magnetic cover 85 overlap the substantially full lengths (dimensions in the horizontal direction of FIG. 7(e)). If the width W2 of the closed portions 85c is set to be greater than the width W1 of the salient poles 74a, the undesired cogging torque of the brushless motor 43 can be reduced, in which case, however, the output torque (steering assist torque) of the brushless motor 43 is also reduced.

Figure 7:
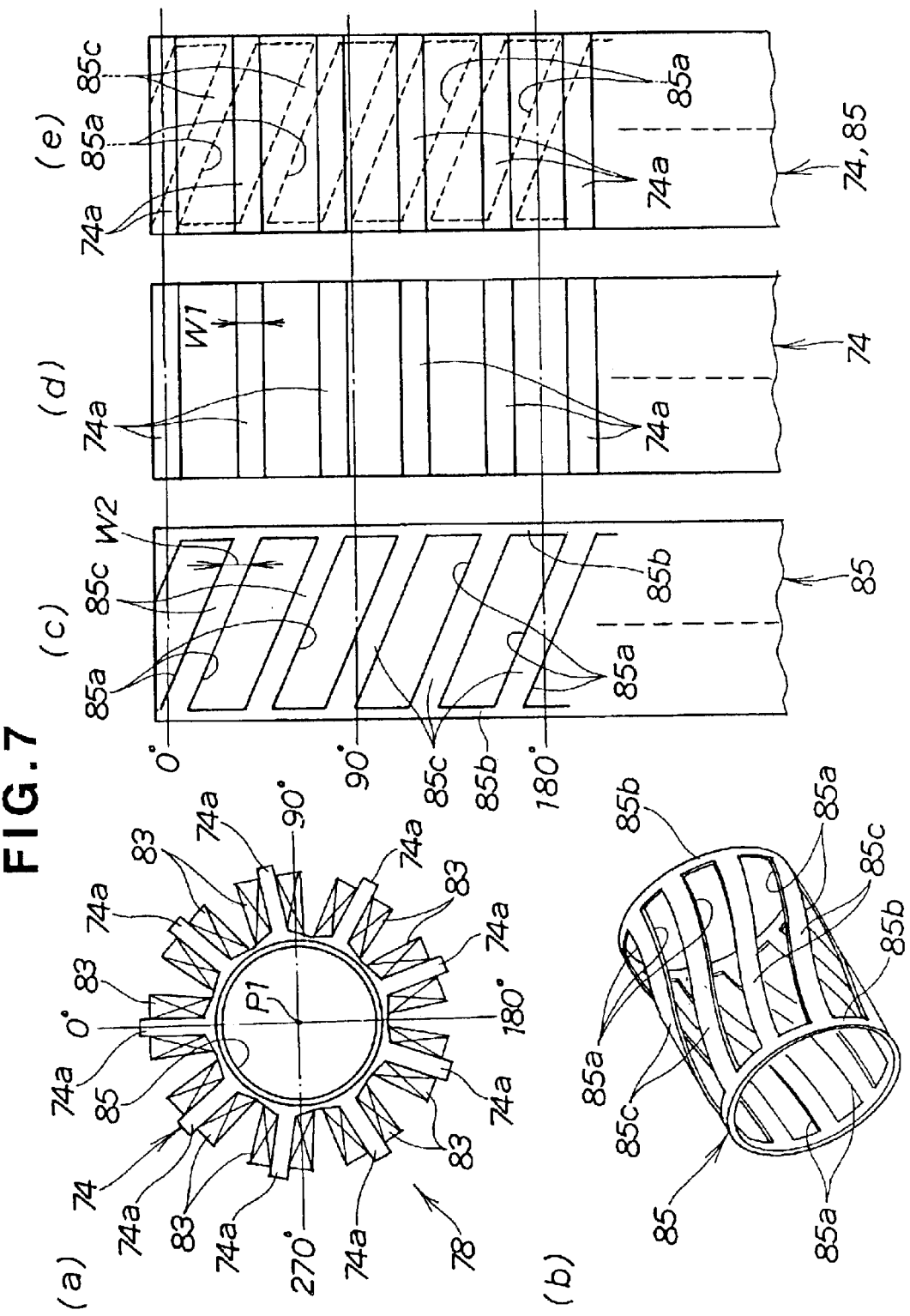
FIG. 7 illustrates more structural details of a second outer stator member and magnetic cover employed in the first embodiment.

Now, operation of the above-described brushless motor 43 will be described with primary reference to FIG. 7.

With the arrangement that the inner (rotor-side) surface 74b (see FIG. 5) of the outer stator 78 is covered with the cylindrical magnetic cover 85 of a small wall thickness and the slits 85a inclined with respect to the centerline P1 of the rotor rotation shaft (motor shaft) are formed at the predetermined intervals, the magnetic substance can be left between the slits 85a of the cover 85, to thereby provide the closed portions (magnetic portions) 85c. These magnetic portions 85c function to restrict magnetic attraction and repulsion between the magnetic poles of the outer stator 78 and inner rotor 75. Further, with the provision of such magnetic portions 85c, the boundaries between the magnetic poles are virtually inclined with respect to the centerline P1 of the rotation shaft of the rotor 75. As a consequence, it is possible to reduce the undesired cogging torque of the brushless motor 43.

With only the simple arrangement that the slits 85a inclined with respect to the centerline P1 are formed at the predetermined intervals in the cylindrical magnetic cover 85 of a small wall thickness and the rotor-side surface 74b of the outer stator 78 is covered with such a magnetic cover 85, the magnetic poles of the outer stator 78 can be readily inclined. Therefore, the cogging torque of the brushless motor 43 can be reduced with the simple construction of the motor 43.

Further, by only appropriately forming the slits 85a inclined with respect to the centerline P1, it is possible to freely set the shapes, sizes and inclination angles of the slits 85a and magnetic portions 85c, with optimization of the output torque and anti-cogging measures taken into account. Besides, no particular consideration need be given to conditions of the inner rotor 75 (see FIG. 5).

Figure 8:
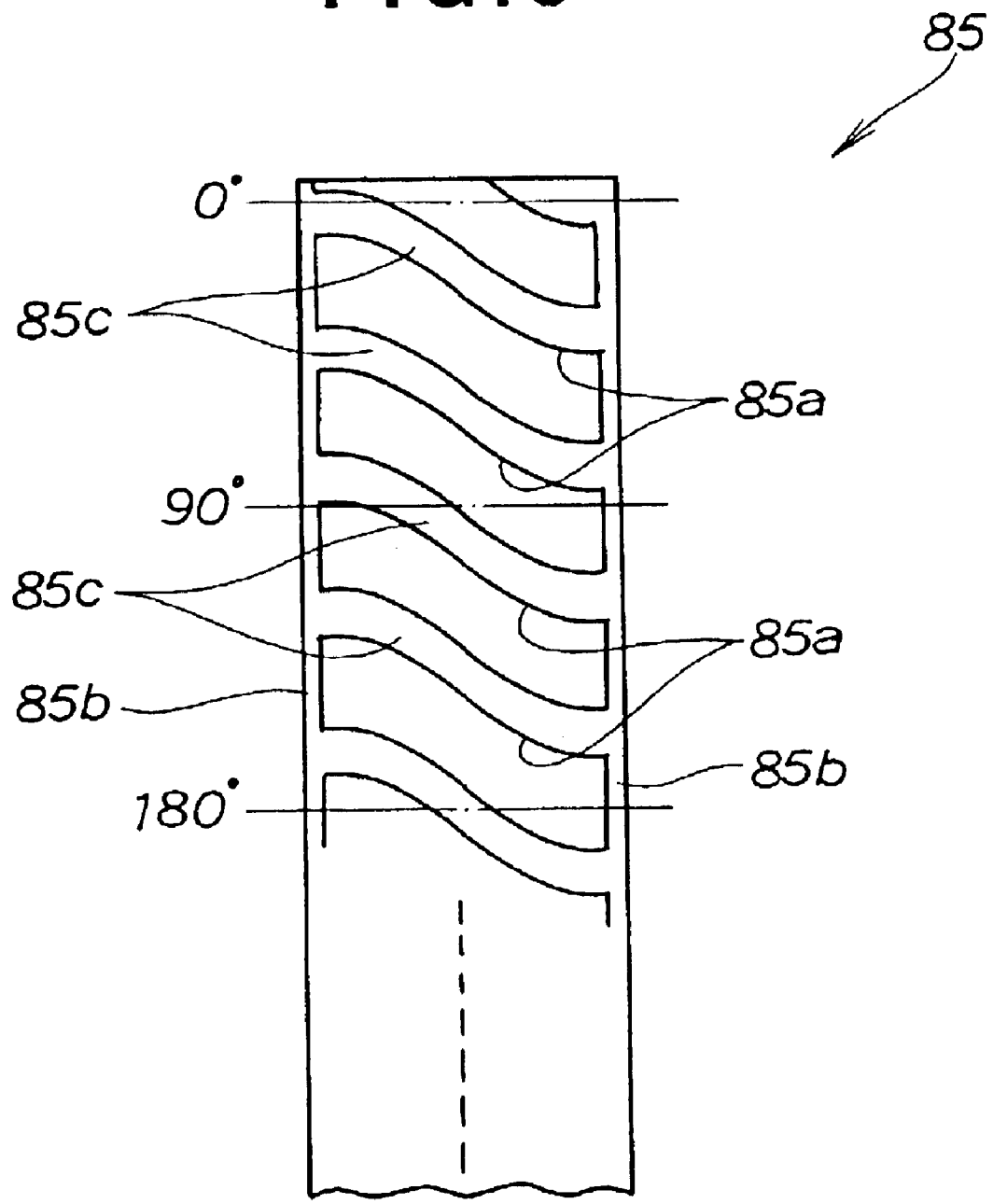
FIG. 8 is a view showing a modification of the magnetic cover in the first embodiment.

FIG. 8 shows a modification of the magnetic cover 85. The modified magnetic cover 85 is shown as developed as in the illustrated example of FIG. 7(c). The modified magnetic cover 85 is characterized in that, as viewed in the developed state, the slits 85a and closed portions 85c each present a shape of a curved parallelogram.

Figure 9:
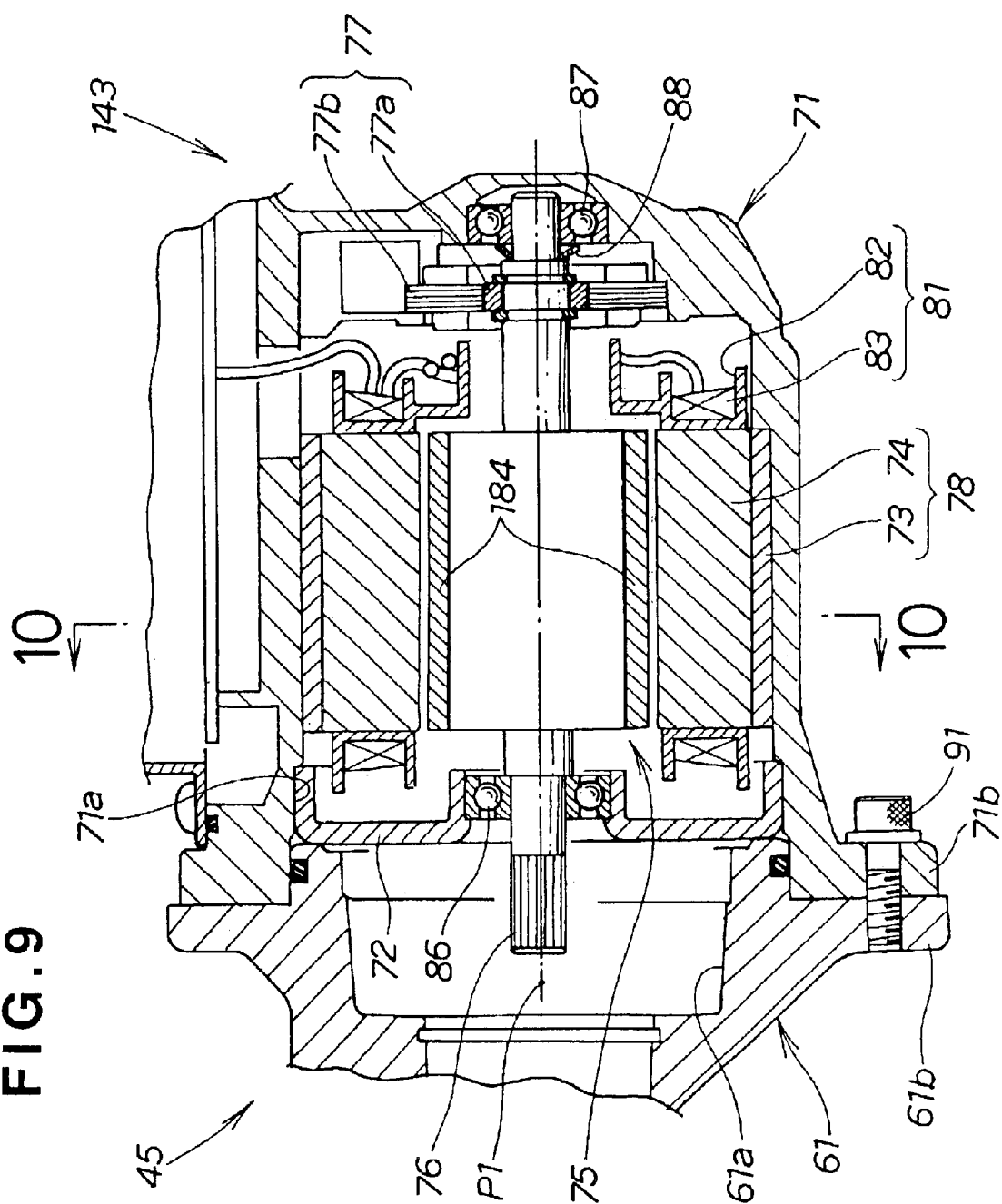
FIG. 9 is a sectional view showing a brushless motor in accordance with a second embodiment of the present invention.
Figure 10:
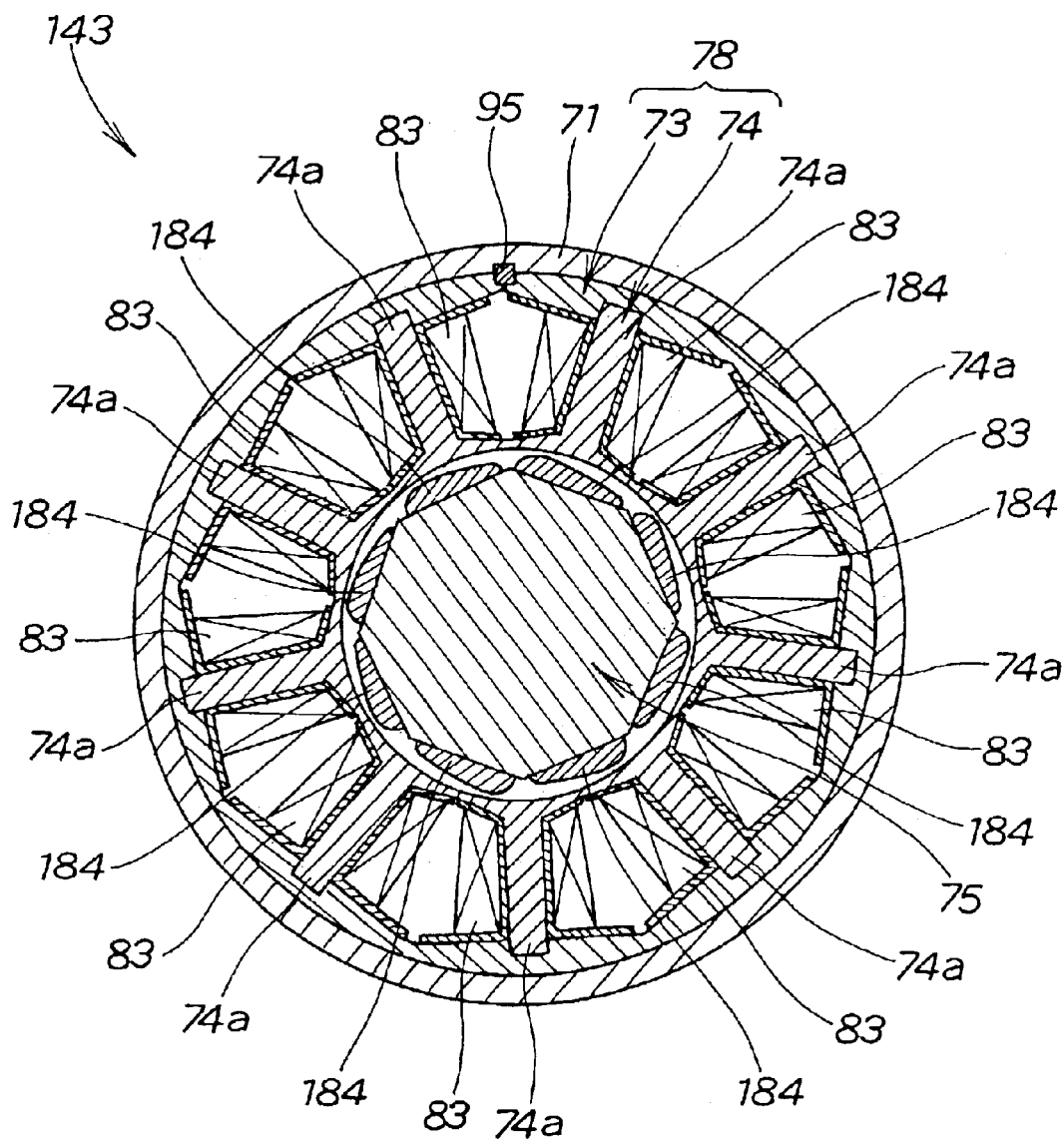
FIG. 10 is a sectional view of the brushless motor taken along the 10—10 line of FIG. 9.

Next, a description will be given about a second embodiment of the brushless motor, with reference to FIGS. 9 to 13. FIGS. 9 and 10 shows the second embodiment of the brushless motor 143 in section similarly to FIGS. 3 and 4.

The brushless motor 143 is different from the first embodiment of the brushless motor 43 in that the magnetic cover 85 is omitted and the permanent magnets 184 are modified in construction. In the second embodiment 143, the elements represented by the same reference numerals as in the first embodiment are constructed in the same manner as the counterparts in the first embodiment and will not be described here to avoid unnecessary duplication.

Figure 11A:
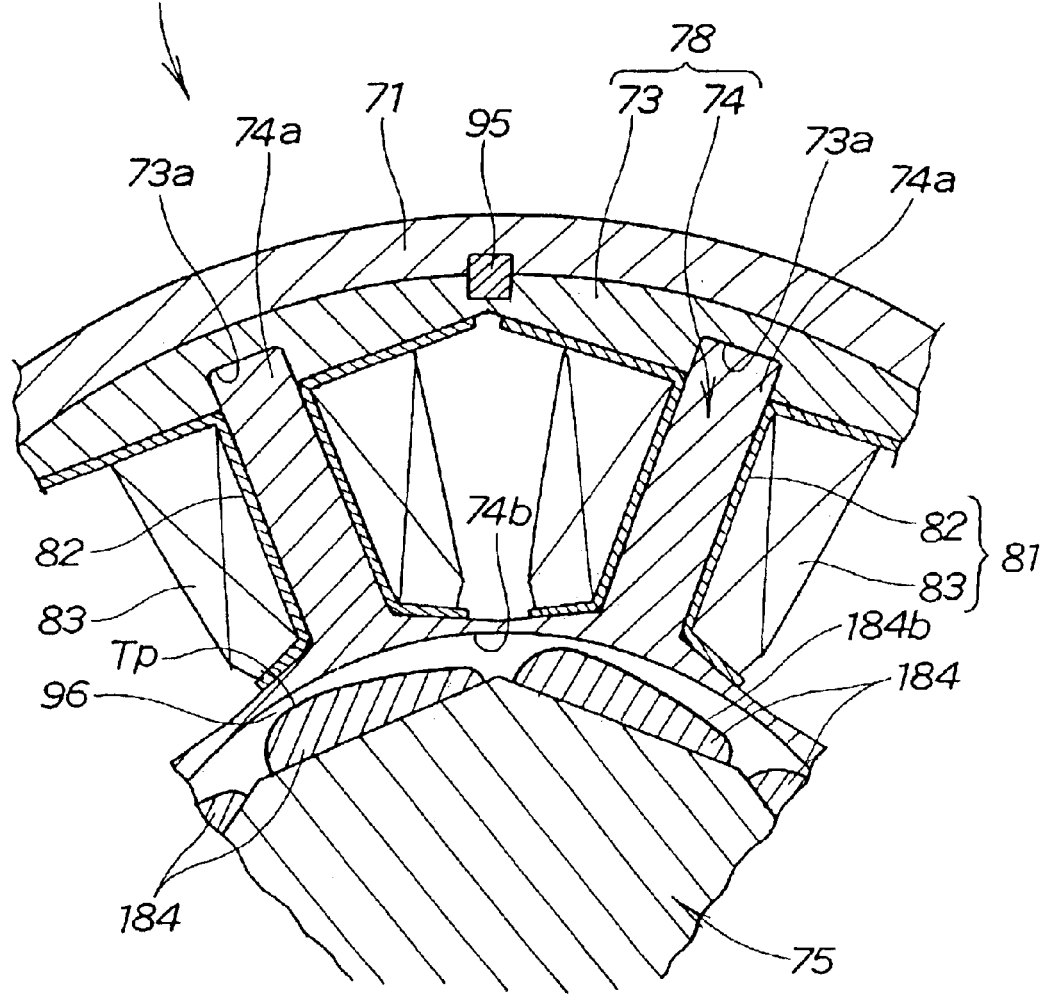
FIG. 11A is an enlarged sectional view showing part of the brushless motor shown in FIG. 10.
Figure 11B:
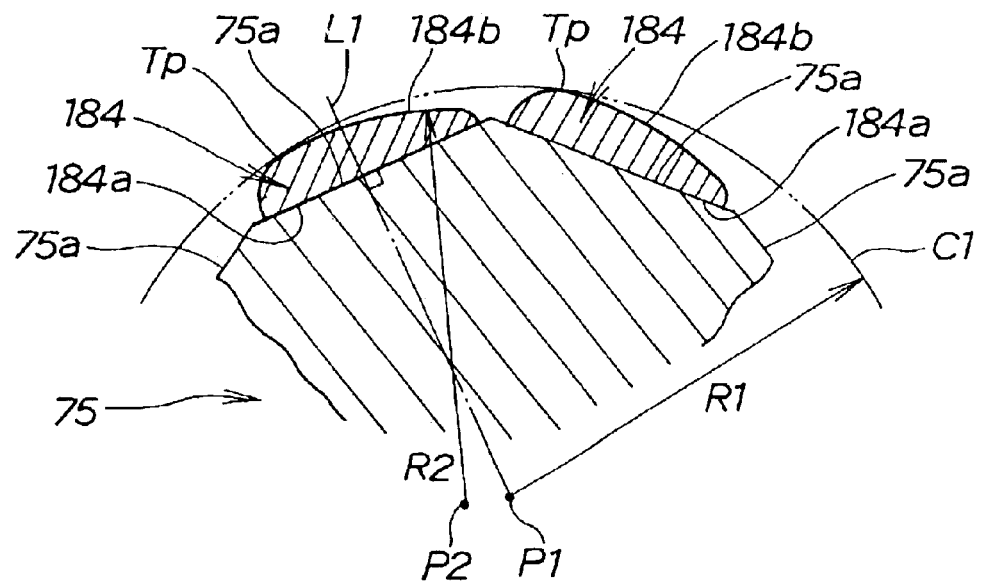
FIG. 11B is a sectional view showing relationship between an outer stator member and inner rotor of FIG. 11A.

FIG. 11A shows portions of the outer stator 78 and inner rotor 75 of FIG. 10 on a magnified scale, and FIG. 11B shows some of the permanent magnets 184 provided on the inner rotor 75.

As seen in FIG. 11B, the inner rotor 75 has a sectional shape of a regular polygon, which has a plurality of flat magnet mounting surfaces 75a, formed at equal intervals on its outer periphery, for securing thereto the permanent magnets 184. Each of the magnet mounting surfaces 75a extends at right angles to a reference line L1 extending radially from the centerline P1 of the rotation shaft of the inner rotor 75. The total number of the magnet mounting surfaces 75a is equal to the total number of the permanent magnets 184.

The inner rotor 75 with the plurality of permanent magnets 184 secured thereto has a maximum radius R1 (which will hereinafter referred to simply as the radius of the inner rotor 75). As illustrated in FIG. 11A, a small air gap 96 is left between the outer surfaces of the permanent magnets 184 secured to the inner rotor 75 and the inner surface 74b of the outer stator member 74.

Each of the permanent magnets 184 in the brushless motor 143 has an asymmetrical sectional shape. Specifically, each of the permanent magnets 184, as shown in FIG. 11B, has a flat rotor-secured surface 184a that is secured to the magnet mounting surface 75a by adhesion or otherwise and a stator-side surface 184b opposed to the inner surface 74b of the second outer stator member 74. The stator-side surface 184b is an arcuate surface having a radius of curvature R2. The radius of curvature R2 is identical or almost identical in value to the radius R1 of the inner rotor 75.

As noted above, the reference line L1 is a straight line extending radially from the centerline P1 at right angles to the magnet mounting surface 75a. In the inner rotor 75 having the permanent magnets 184 secured thereto, the radius of curvature R2 has a center P2 offset from the reference line L1. Thus, the stator-side surface 184b is inclined with respect to the rotor-secured surface 184a, and each of the permanent magnets 184 has a sectional shape tapering in the circumferential direction of the inner rotor 75 as shown in FIG. 11B. Therefore, each of the permanent magnets 184 has an asymmetrical shape with respect to the reference line L1.

Here, of each of the stator-side surface 184b, a portion most projecting outward in the radial direction of the inner rotor 75 will be referred to as a "most-projecting distal end Tp". Thus, the radius R1 of the inner rotor 75 is a radius of a circular locus C1 (depicted by an imaginary straight line) passing the respective most-projecting distal ends Tp of the permanent magnets 184 secured to the inner rotor 75.

Magnetizing direction of each of the permanent magnets 184 is parallel to the reference line L1, i.e. at right angles to the rotor-secured surface 184a.

Because each of the permanent magnets 184 is formed into an asymmetrical sectional shape, i.e. because the stator-side surface 184b of each of the permanent magnets 184 is inclined, the air gap 96 between the inner peripheral surface 74b of the second outer stator member 74 and the stator-side surface 184b is smaller at the position of the most-projecting distal end Tp than the other positions. The smaller air gap 96 can increase the intensity of the magnetic force acting on the second outer stator member 74.

Figure 12A:
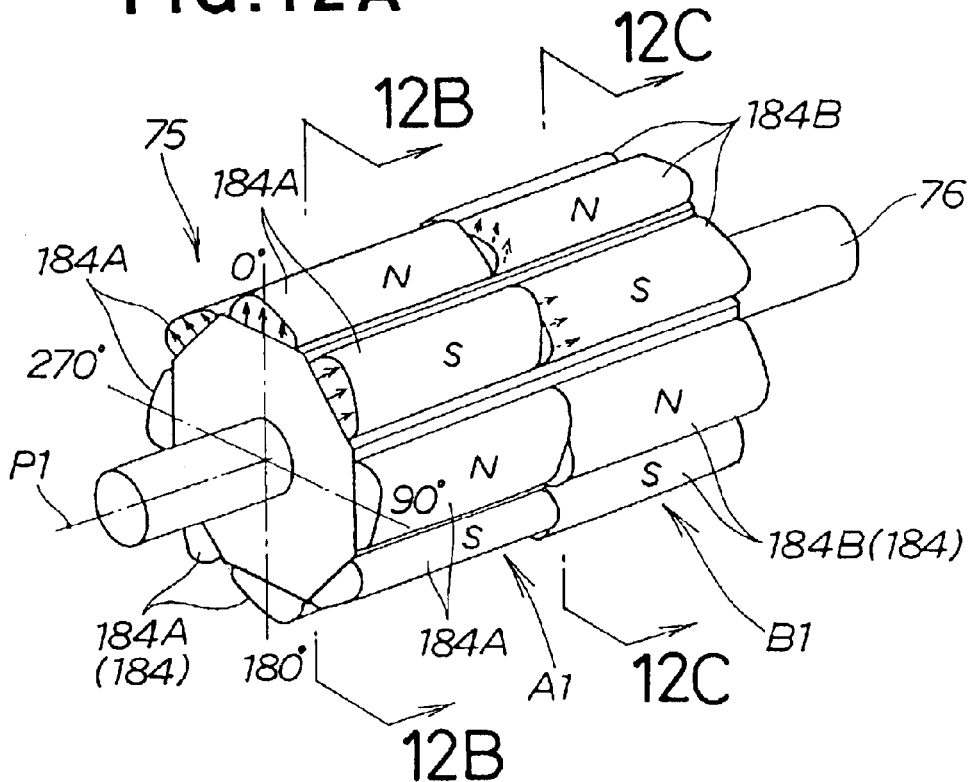
FIG. 12A is a perspective view of the inner rotor having permanent magnets in the second embodiment of the brushless motor.
Figure 12B:
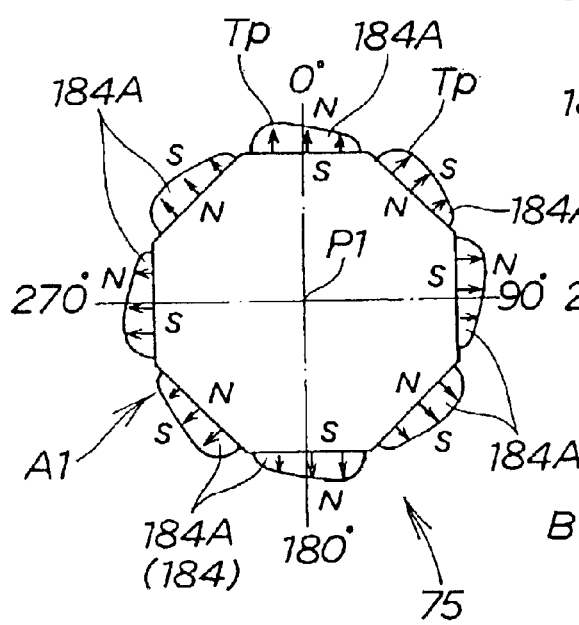
FIG. 12B is a sectional view taken along the 12B—12B line of FIG. 12A.
Figure 12C:
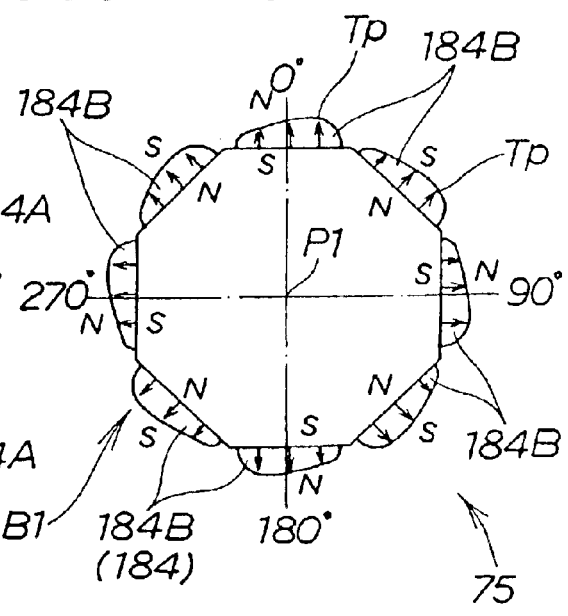
FIG. 12C is a sectional view taken along the 12C—12C line of FIG. 12A.

FIGS. 12A, 12B and 12C show the inner rotor 75 in the second embodiment, where the permanent magnets 184 are secured to the outer surface of the inner rotor 75. The illustrated example of FIG. 12A assumes that the uppermost position is a 0° angular position which is followed by 90°, 180° and 270° angular positions in the clockwise direction of the figure.

Each of the permanent magnets 184 is divided into halves in the longitudinal or axial direction of the rotation shaft of the rotor 75 (motor shaft 76), to provide two divided magnet members, i.e. first and second divided magnet members 184A and 184B. The first and second divided magnet members 184A and 184B have generally the same length, but the first and second divided magnet members 184A and 184B are positioned along the longitudinal or axial direction of the inner rotor 75 in horizontally opposite orientations.

Specifically, a plurality of the first divided magnet members 184A are collectively placed on one longitudinal half of the inner rotor 75, to provide a first magnet member group A1. Similarly, a plurality of the second divided magnet members 184B are collectively placed on the other longitudinal half of the inner rotor 75, to provide a second magnet member group B1.

FIG. 12B shows the first magnet member group A1 placed in such a manner that each of the first divided magnet members 184A presents a sectional shape tapering in the clockwise direction of the figure, and FIG. 12C shows the second magnet member group B1 placed in such a manner that each of the second divided magnet members 184B presents a sectional shape tapering in the counterclockwise direction of the figure.

Specifically, in each of the magnet member groups A1 and B1, the divided magnet members 184A or 184B are placed such that the N and S magnetic poles alternate in the circumferential direction of the rotor 75. More specifically, the second divided magnet members 184B are arranged, at the same angular positions as the first divided magnet members 184, so as to present the same magnetic poles as the first divided magnet members 184. For example, if the first divided magnet member 184A of a given one of the permanent magnets 184 is set to the N magnetic pole, then the second divided magnet member 184B of the given permanent magnet 184 is also set to the N magnetic pole.

Figure 13A:
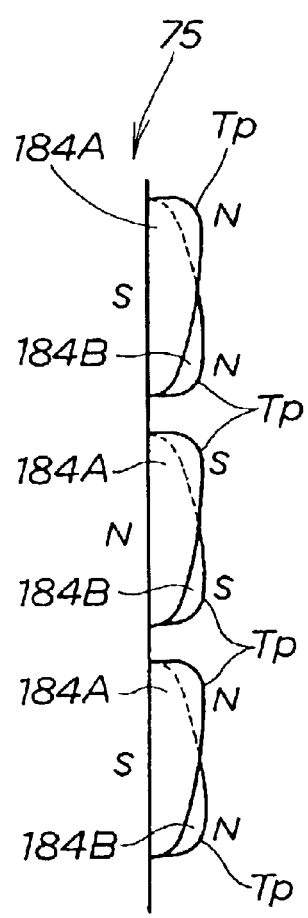
FIGS. 13A and 13B are developed views of the permanent magnets positioned on the inner rotor of FIG. 12A.
Figure 13B:
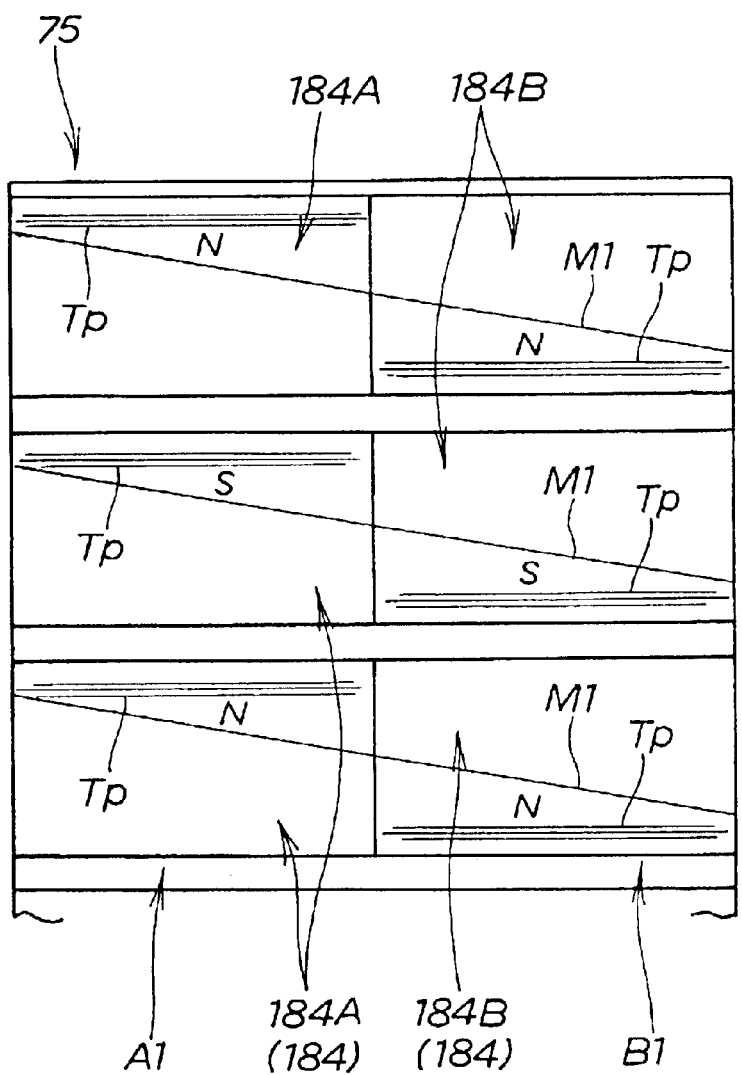

FIGS. 13A and 13B show, in developed views, the inner rotor 75 including the permanent magnets 184 secured thereto. The most-projecting distal ends Tp of the second divided magnet members 184B differ in phase from the most-projecting distal ends Tp of the first divided magnet members 184A.

Next, operation of the above-described brushless motor 143 will be described with primary reference to FIGS. 11 and 13.

With the permanent magnets 184 each having an asymmetrical sectional shape, the air gap 96 between the stator-side surface 184b and the rotor-side surface 74b is not uniform as seen in FIGS. 11A and 11B. The air gap 96 is smaller at the position of the most-projecting distal end Tp, closest to the rotor-side surface 74b, than the other positions. The thus-reduced air gap 96 can increase the intensity of the magnetic force acting on the outer stator 78.

Further, with the permanent magnets 184 each having a tapering sectional shape and divided into substantial equal haves and with each of the thus-divided magnet members positioned in horizontally opposite orientations along the longitudinal or axial direction of the inner rotor 75, the most-projecting distal ends Tp of the first and second divided magnet members Tp differ in phase. If the most-projecting distal ends Tp of the different phases are connected by an imaginary straight line M1, the imaginary straight line M1 will slant with respect to the rotation shaft of the rotor 75. Regions overlapping the imaginary straight line M1 and regions in the neighborhood of the imaginary straight line M1 may be considered to be regions where the magnetic force acting on the outer stator 78 (see FIG. 11A) is greatest, i.e. virtual strong magnetism regions.

A specific number of the virtual strong magnetism regions, corresponding to the number of the permanent magnets 184 or magnetic poles, are produced along the circumferential direction of the inner rotor 75. Also, between the virtual strong magnetism regions, there are produced regions where the magnetic force acting on the outer stator 78 is smallest, i.e. virtual weak magnetism regions. These virtual weak magnetism regions function as virtual magnetic pole boundaries, so that the weak magnetism regions are virtually inclined with respect to the rotation shaft of the inner rotor 75. Thus, it is possible to reduce the cogging torque of the brushless motor 143 (see FIG. 11A).

With the simple arrangements having been described above, the magnetic poles on the inner rotor 75 can be inclined with ease. Further, because it is only necessary that the permanent magnets 184, each having a tapering sectional shape, be divided into substantial equal haves and the thus-divided magnet members be placed in horizontally opposite orientations along the longitudinal or axial direction of the inner rotor 75, the permanent magnets 184 can be secured to the inner rotor 75 with ease. Thus, it is possible to minimize the cogging torque of the brushless motor 143.

Next, a description will be given about a third embodiment of the brushless motor for use in the electric power steering apparatus, with reference to FIGS. 14 to 17.

The third embodiment of the brushless motor 243 is different from the second embodiment 143 of FIG. 10 in terms of the construction of the plurality of permanent magnets 284. Except for the permanent magnets 284, the third embodiment 243 is similar in construction to the second embodiment 143. In the third embodiment 243, the elements represented by the same reference numerals as in the second embodiment 143 are constructed in the same manner as the counterparts in the second embodiment 143 and will not be described here to avoid unnecessary duplication. Note that the third embodiment of the brushless motor 243 does not have the magnetic cover 85 of FIG. 3 employed in the first embodiment.

Figure 14:
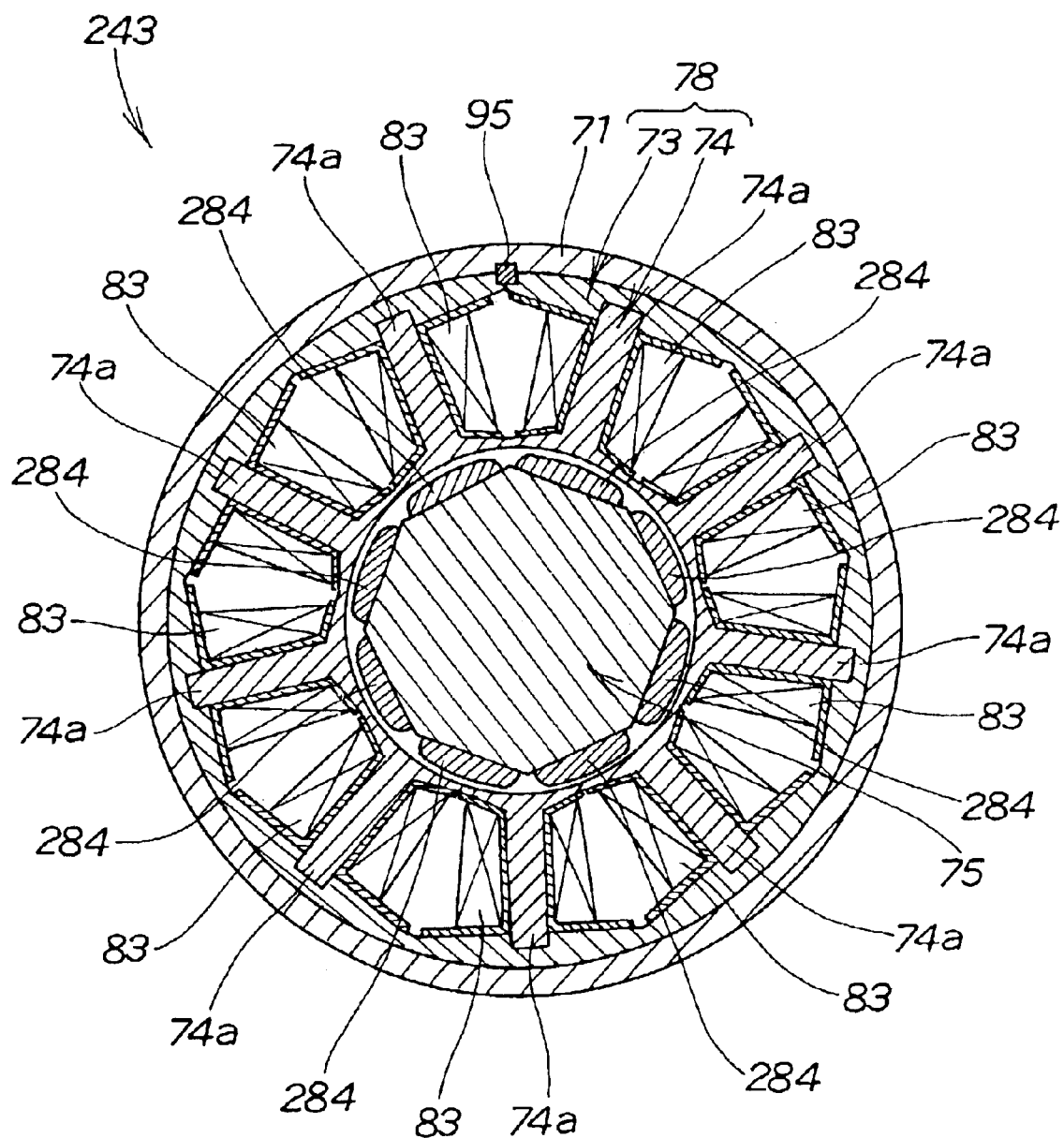
FIG. 14 a sectional view showing a brushless motor in accordance with a third embodiment of the present invention.
Figure 15:
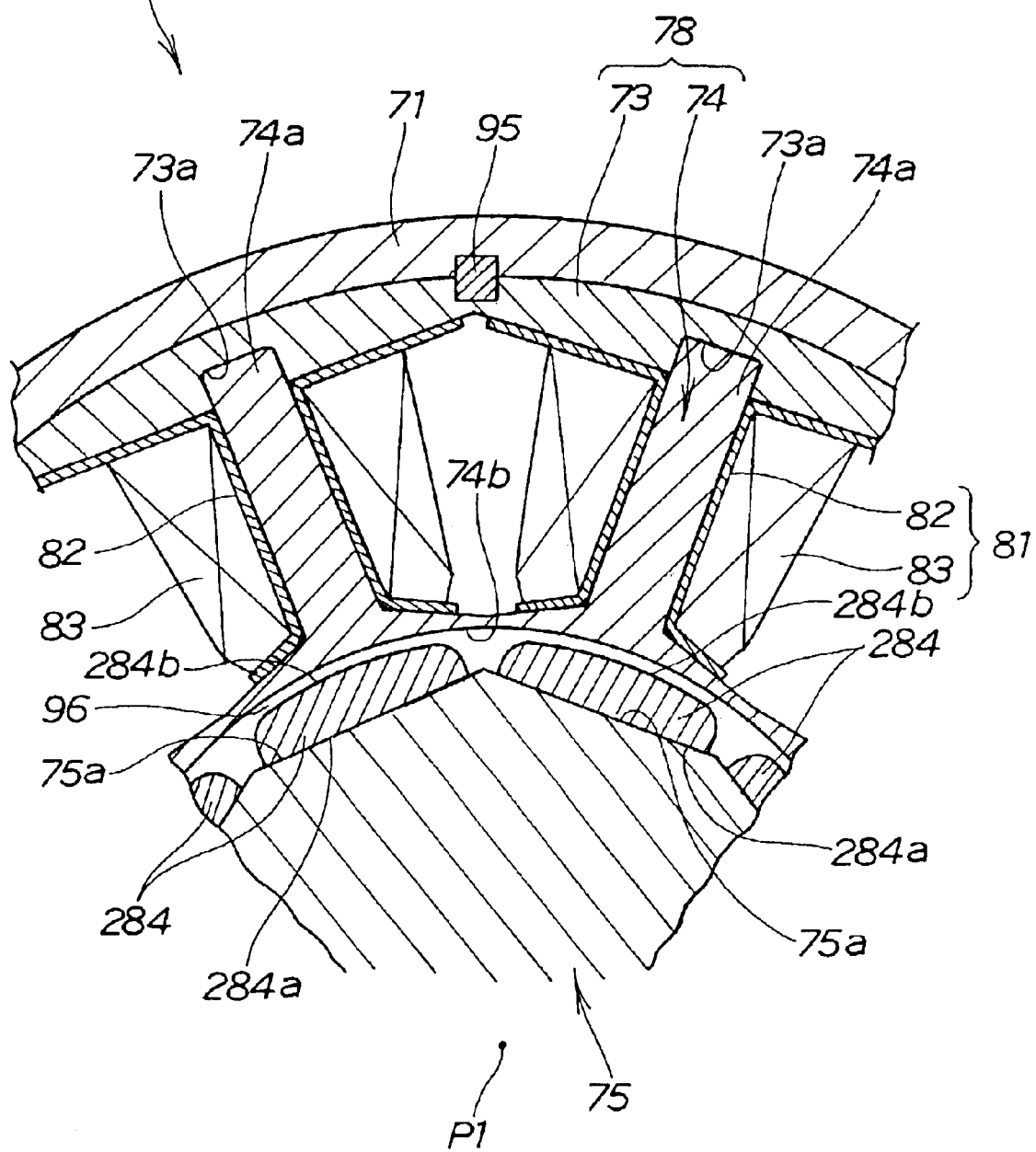
FIG. 15 is an enlarged fragmentary view of the brushless motor of FIG. 14.

FIG. 15 shows portions of the outer stator 78 and inner rotor 75 of FIG. 14 on a magnified scale.

As seen in FIG. 15, the inner rotor 75 has a sectional shape of a regular polygon, which has a plurality of flat magnet mounting surfaces 75a, formed at equal intervals on its outer periphery, for securing thereto the permanent magnets 284.

Each of the permanent magnets 284 has a flat rotator-secured surface 284a secured to the magnet mounting surface 75a by adhesion or otherwise and a stator-side surface 184b opposed to the inner surface 74b of the second outer stator member 74.

The stator-side surface 184b of each of the permanent magnets 284 has an arcuate shape corresponding to part of a perfect circle concentric with the center P1 of the inner rotor 75. Therefore, the air gap 96 between the outer peripheral surfaces of the permanent magnets 284 secured to the inner rotor 75 and the inner circumferential surface 74b of the second outer stator member 74 is generally uniform.

Figure 16A:
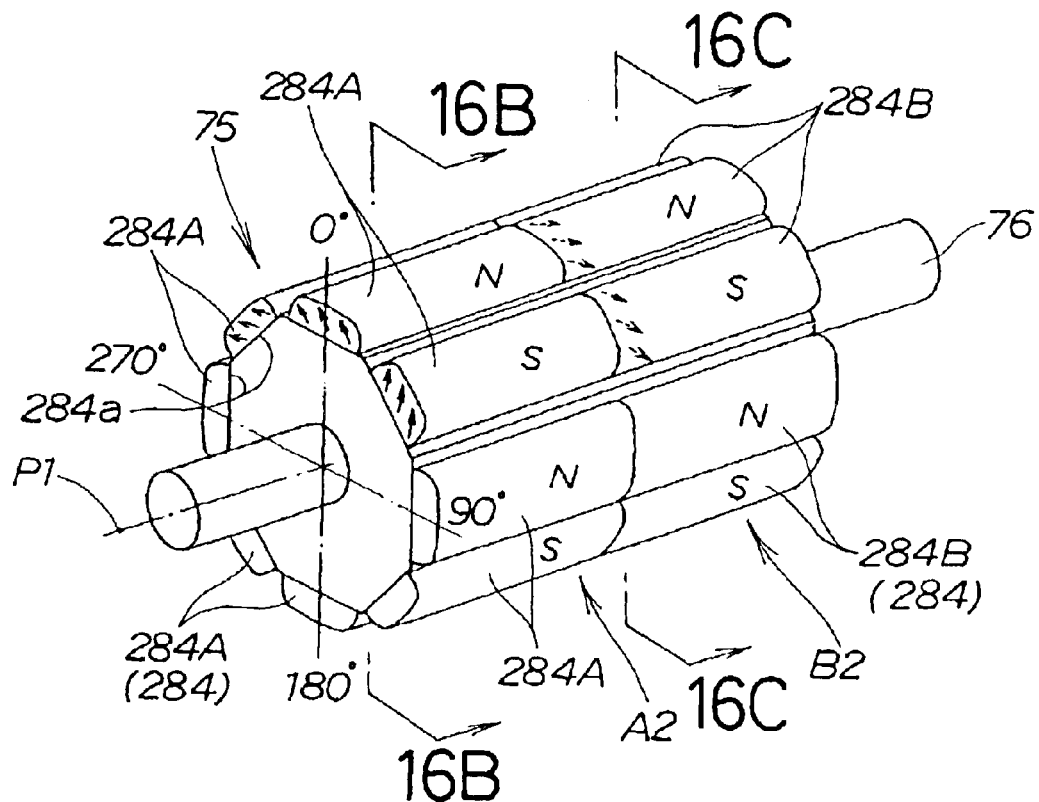
FIG. 16A is a perspective view of an inner rotor having permanent magnets in the third embodiment of the brushless motor.
Figure 16B:
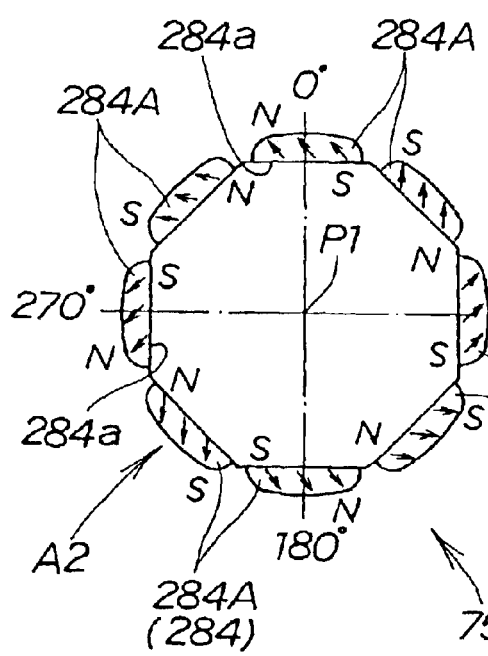
FIG. 16B is a sectional view taken along the 16B—16B line of FIG. 16A.
Figure 16C:
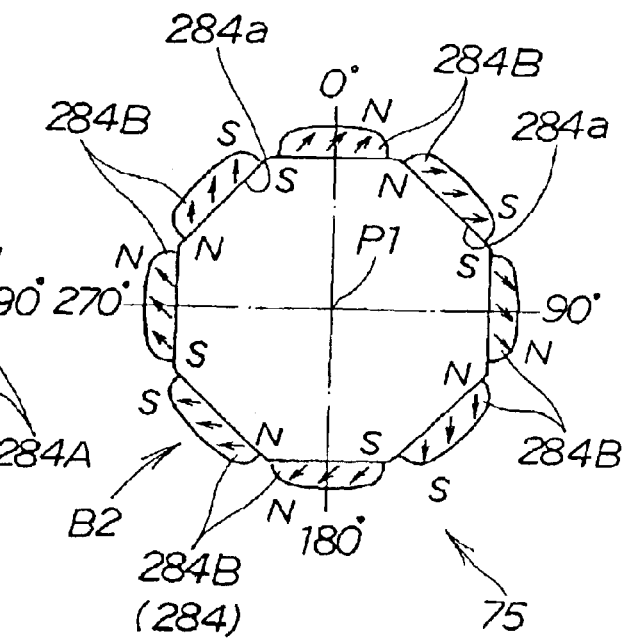
FIG. 16C is a sectional view taken along the 16C—16C line of FIG. 16A.

FIGS. 16A to 16C show the inner rotor 75 employed in the third embodiment, where the permanent magnets 284 are secured to the outer surface of the inner rotor 75. The illustrated example of FIG. 16A assumes that the uppermost position is a 0° angular position which is followed by 90°, 180° and 270° angular positions in the clockwise direction of the figure.

Each of the permanent magnets 284, which is magnetized in a direction inclined with respect to the rotor-secured surface 284a, is divided into substantial equal haves in the longitudinal or axial direction of the rotation shaft of the rotor 75, to provide two divided magnet members, i.e. first and second divided magnet members 284A and 284B that have generally the same length. The first and second divided magnet members 284A and 284B are placed along the longitudinal or axial direction of the inner rotor 75 in horizontally opposite orientations.

Specifically, a plurality of the first divided magnet members 284A are collectively placed on one longitudinal half of the inner rotor 75, to provide a first magnet member group A2. Similarly, a plurality of the second divided magnet members 184A are collectively placed on the other longitudinal half of the inner rotor 75, to provide a second magnet member group B2.

FIG. 16B shows that the magnetizing direction of each of the first divided magnet members 284A is inclined at a predetermined angle in the left and upper direction of the figure with respect to the rotor-secured surface 284a.

FIG. 16C shows that the magnetizing direction of each of the second divided magnet members 284B is inclined at a predetermined angle in the right and upper direction of the figure with respect to the rotor-secured surface 284a. Namely, the first divided magnet members 284A and second divided magnet members 284B are magnetized obliquely at the respective predetermined angles in circumferentially opposite directions. For example, if the first divided magnet member 284A of a particular one of the permanent magnets 284 is set to the N magnetic pole, then the second divided magnet member 284B of the particular permanent magnet 284 is also set to the N magnetic pole.

Figure 17:
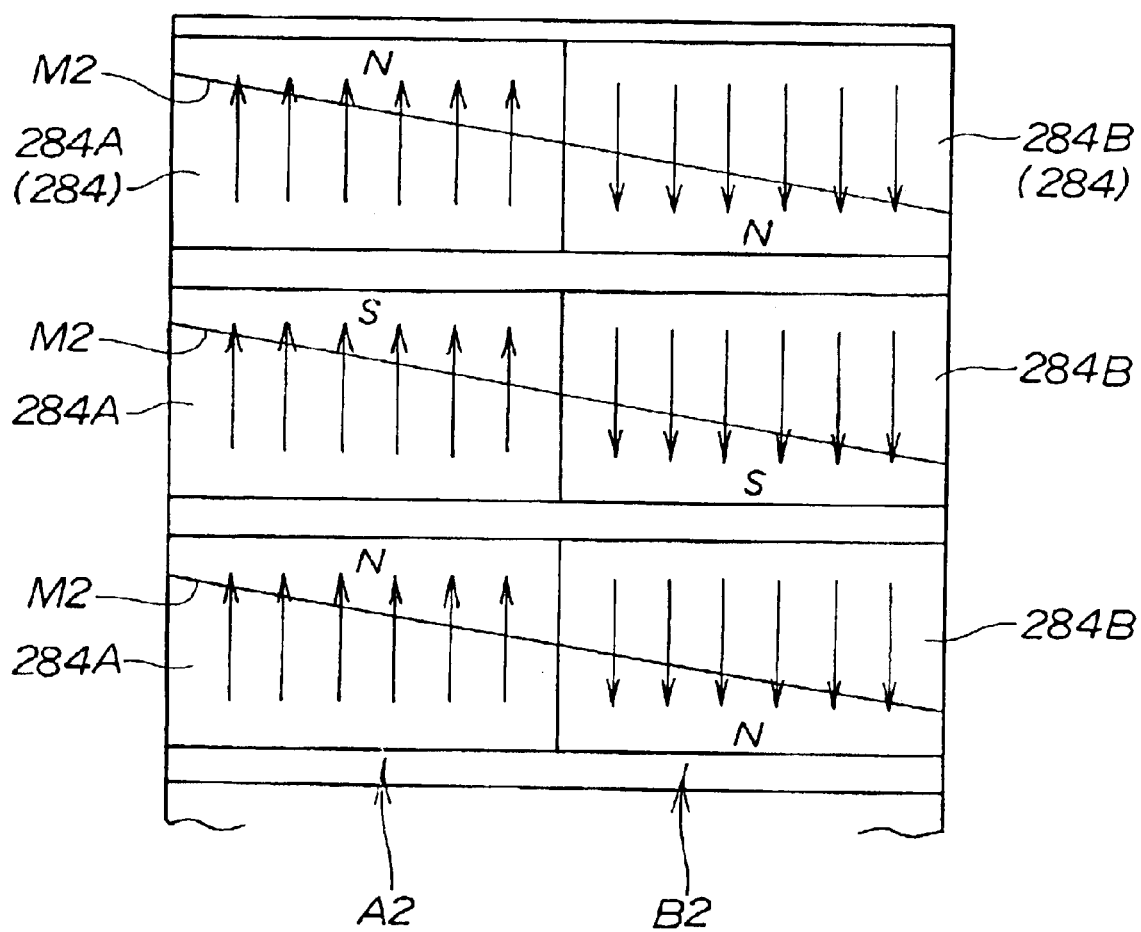
FIG. 17 is a developed view of the permanent magnets positioned on the inner rotor of FIG. 16A.

FIG. 17 is a developed view of the inner rotor employed in the third embodiment, which specifically shows the permanent magnets 284 in a developed state. The magnetizing direction of the second divided magnet members 284B differs from that of the first divided magnet members 284A.

The following paragraphs describe operation of the third embodiment of the brushless motor 243, with primary reference to FIGS. 15–17.

With the permanent magnets 284 magnetized in the directions inclined, along the circumferential direction of the rotor 75, with respect to the rotor-secured surfaces 284a as shown in FIG. 16A, the position of the magnetic force (magnetic poles) of each of the magnets 284 can be slanted in the circumferential direction of the rotor 75. The magnetic force of each of the magnets 284 is greatest at the positions of the slanted magnetic poles.

Namely, because each of the permanent magnets 284 having the slanted magnetic force position is divided in the axial direction of the rotor 75 into substantial equal halves and the first and second divided magnet members are positioned on the rotor in such a manner that the magnetizing direction of one of the first and second divided magnet members is opposite that of the other divided magnet member, the respective magnetic forces of the first and second divided magnet members differ in phase.

If the magnetic poles of the different phases are connected by an imaginary straight line M2, the line M2 is inclined with respect to the centerline P1 (see FIG. 16) of the motor shaft, as seen in FIG. 17. Regions overlapping the imaginary straight line M2 and regions in the neighborhood of the imaginary straight line M2 may be considered to be regions where the magnetic force acting on the outer stator 78 (see FIG. 15) is greatest, i.e. virtual strong magnetism regions.

A specific number of the virtual strong magnetism regions, corresponding to the number of the permanent magnets 284 or magnetic poles, are produced along the circumferential direction of the inner rotor 75. Also, between the virtual strong magnetism regions, there are produced regions where the magnetic force acting on the outer stator 78 is smallest, i.e. virtual weak magnetism regions. These virtual weak magnetism regions function as virtual magnetic pole boundaries, so that the weak magnetism regions are virtually inclined with respect to the centerline P1. Thus, it is possible to reduce the cogging torque of the brushless motor 243.

With the simple arrangements having been described above, the magnetic poles on the inner rotor 75 can be inclined with ease. Further, because it is only necessary that the permanent magnets 284, each having the magnetic force position slanted, be divided into substantial equal haves and the thus-divided magnet members be placed in horizontally opposite orientations along the longitudinal or axial direction of the inner rotor 75, the permanent magnets 284 can be secured to the inner rotor 75 with ease. Thus, it is possible to minimize the cogging torque of the brushless motor 243.

The electric power steering apparatus 10 of the present invention can be equipped with any one of the brushless motors 43, 143 and 243 having been described above.

Further, the brushless motors 43, 143 and 243 may be constructed in any other desired manner as long as they comprise a combination of a stator including a plurality of armatures and a rotor having a plurality of permanent magnets. For example, the brushless motor of the present invention may be other than the inner-rotor type brushless motor, such as an outer-rotor type brushless motor. Also, the numbers of the armatures and permanent magnets may be chosen as desired.

Further, the magnetic cover 85 employed in the first embodiment of FIG. 5 maybe formed of any desired magnetic material.

Moreover, each of the permanent magnets 184 and 284 in the second and third embodiment may be divided into any other suitable number of magnet members than just two.

The present disclosure relates to the subject matter of Japanese Patent Application No. 2002-128411, filed Apr. 30, 2002, the disclosure of which is expressly incorporated herein by reference in its entirety.

What is claimed is:

1. A brushless motor comprising:
a stator including a plurality of armatures;
a rotor provided in operative combination with said stator and including a plurality of permanent magnets positioned on and along a circumference thereof; and
a cover formed of a magnetic material into a cylindrical shape having a relatively small wall thickness, said cover covering a surface of said stator opposed to said rotor, said cover having a plurality of slits formed therein to incline with respect to a rotational axis of said rotor.

2. An electric power steering apparatus for use in a motor vehicle comprising:
a steering system extending from a steering wheel to steerable road wheels;
a steering torque sensor for detecting steering torque produced on said steering wheel, to thereby generate a steering torque detection signal;
a brushless motor for generating steering assist torque under control of a control unit on the basis of the steering torque detection signal generated by said steering torque sensor; and
a torque transmission mechanism for transmitting the steering assist torque, generated by said brushless motor, to said steering system,
said brushless motor comprising:
a stator including a plurality of armatures;
a rotor provided in operative combination with said stator and including a plurality of permanent magnets positioned on and along a circumference thereof; and
a cover formed of a magnetic material into a cylindrical shape having a relatively small wall thickness, said cover covering a surface of said stator opposed to said rotor, said cover having a plurality of slits formed therein to incline with respect to a rotational axis of said rotor.

3. A brushless motor according to claim 1, wherein the stator further includes a plurality of salient poles on which the respective armatures are disposed, and the slits formed in the cylindrical cover are arranged so that the center of each slit overlaps a substantial center portion of a corresponding one of the salient poles.

4. A brushless motor according to claim 3, wherein the salient poles of the stator are equal in number to the slits in the cylindrical cover.

5. A brushless motor according to claim 2, wherein the stator further includes a plurality of salient poles on which the respective armatures are disposed, and the slits formed in the cylindrical cover ire arranged so that the center of each slit overlaps a substantial center portion of a corresponding one of the salient poles.

6. A brushless motor according to claim 5, wherein the salient poles of the stator are equal in number to the slits in the cylindrical cover.

* * * * *